United States Patent
Liu et al.

(10) Patent No.: US 10,685,430 B2
(45) Date of Patent: Jun. 16, 2020

(54) SYSTEM AND METHODS FOR GENERATING AN OPTIMIZED 3D MODEL

(71) Applicant: Babylon VR Inc., Kitchener (CA)

(72) Inventors: Boyang Liu, Waterloo (CA); Yuchi Zhong, Beijing (CN); Nanyi Jiang, Waterloo (CA)

(73) Assignee: Babylon VR Inc., Kitchener (CA)

( * ) Notice: Subject to any disclaimer, the term of this patent is extended or adjusted under 35 U.S.C. 154(b) by 0 days.

(21) Appl. No.: 15/975,837

(22) Filed: May 10, 2018

(65) Prior Publication Data
US 2018/0330480 A1 Nov. 15, 2018

Related U.S. Application Data

(60) Provisional application No. 62/504,013, filed on May 10, 2017.

(51) Int. Cl.
*G06T 5/00* (2006.01)
*G06T 17/20* (2006.01)
(Continued)

(52) U.S. Cl.
CPC .............. *G06T 5/006* (2013.01); *G06T 5/003* (2013.01); *G06T 15/04* (2013.01); *G06T 17/20* (2013.01);
(Continued)

(58) Field of Classification Search
CPC ......... G06T 5/006; G06T 5/003; G06T 15/04; G06T 17/20; G06T 17/205; G06T 19/20; G06T 2210/36
See application file for complete search history.

(56) References Cited

U.S. PATENT DOCUMENTS

| 6,384,826 B1 * | 5/2002 | Bern ...................... G06T 17/20 345/420 |
| 2005/0107695 A1 * | 5/2005 | Kiraly ..................... G06T 15/06 600/431 |

(Continued)

OTHER PUBLICATIONS

"Mesh Simplification", downloaded from graphics.stanford.edu/courses/cs468-10-fall/LectureSlides/08_Simplification.pdf on Mar. 2017.

(Continued)

*Primary Examiner* — Abderrahim Merouan
(74) *Attorney, Agent, or Firm* — Own Innovation; James W. Hinton

(57) ABSTRACT

Provided is a system and method for generating an optimized 3D model. The system includes a processor for receiving a high-poly 3D model, wherein the processor is configured to: divide the high-poly 3D model into a plurality of subcomponents, approximate each subcomponent of the plurality of subcomponents by a geometric shape, adjust the geometric shape to conform to the subcomponent to the geometric shape, merge the adjusted geometric shapes to form a reduced 3D model, and texture map the reduced 3D model to provide texture of the high-poly 3D model to form the optimized 3D model. The system also includes a memory connected to the processor for storing the high-poly 3D model and the optimized 3D model and a 3D model display for displaying the optimized 3D model.

6 Claims, 31 Drawing Sheets

(51) Int. Cl.
 *G06T 15/04* (2011.01)
 *G06T 19/20* (2011.01)
(52) U.S. Cl.
 CPC .......... *G06T 17/205* (2013.01); *G06T 19/20* (2013.01); *G06T 2210/36* (2013.01)

(56) References Cited

U.S. PATENT DOCUMENTS

| | | | |
|---|---|---|---|
| 2009/0063118 A1* | 3/2009 | Dachille | G06F 19/321 703/11 |
| 2010/0277476 A1* | 11/2010 | Johansson | G06T 17/20 345/423 |
| 2011/0050691 A1* | 3/2011 | Hamedi | G06T 17/205 345/420 |
| 2015/0178988 A1* | 6/2015 | Montserrat Mora | G06T 13/40 345/420 |
| 2017/0048592 A1* | 2/2017 | Branch | H04N 21/41407 |
| 2017/0169608 A1* | 6/2017 | Starhill | G06T 17/10 |
| 2018/0144545 A1* | 5/2018 | Legrand | G06T 17/205 |
| 2018/0275410 A1* | 9/2018 | Yeoh | H04N 13/344 |
| 2019/0138670 A1* | 5/2019 | Bandara | G06F 17/5009 |

OTHER PUBLICATIONS

"Poisson Surface Reconstruction", downloaded from http://vr.tu-freiberg.de/scivi/?page_id=365 on Mar. 2017.

* cited by examiner

4080

SYSTEM AND METHODS FOR GENERATING AN OPTIMIZED 3D MODEL

CROSS REFERENCE TO RELATED APPLICATION

This application claims priority from U.S. Provisional Patent Application Ser. No. 62/504,013, filed May 10, 2017, the entire contents of all of which are hereby incorporated by reference.

TECHNICAL FIELD

The embodiments disclosed herein relate to systems and methods for virtual reality experiences and more particularly to a system and methods for generating an optimized 3D models for virtual reality experiences.

INTRODUCTION

Virtual reality (VR) technology and the introduction of commercial VR platforms allow users to enjoy VR on a variety of VR platforms. For example, a VR platform may use a mobile headset shell holding a smartphone. A VR platform may be a more fully integrated VR headset with external components. VR platforms may be used to host a large variety of VR experiences, such as VR games, VR videos and whole VR worlds. Many of these VR experiences are formed of one or more VR assets, such as a three-dimensional (3D) model.

Existing methods of VR experience optimization may lose effectiveness at lower polygon counts, may require the original model to be clean with no overlapping faces, and may not apply localized optimization. Accordingly, there may be a need for an optimized VR experience.

Optimization of VR experiences by compressing VR assets may assist in enabling complex VR experiences to be experienced on platforms which may not otherwise be capable of handling complex VR experience, such as when the platform does not have sufficient processing power to execute a complex VR experience. Optimization of VR assets may improve the performance of VR platforms.

SUMMARY

In accordance with an embodiment of the invention, there is provided a system for making an optimized three-dimensional (3D) model. The system includes: i) a processor for receiving a high-poly 3D model, wherein the processor is configured to: divide the high-poly 3D model into a plurality of subcomponents; approximate each subcomponent of the plurality of subcomponents by a geometric shape; adjust the geometric shape to conform to the subcomponent; merge the adjusted geometric shapes to form a reduced 3D model; and texture map the reduced 3D model to provide texture of the high-poly 3D model to form the optimized 3D model; ii) a memory connected to the processor for storing the high-poly 3D model and the optimized 3D model; and iii) a 3D model display for displaying the optimized 3D model.

In some embodiments, the processor is further configured to sharpen edges in the adjusted geometric shapes before merging the adjusted geometric shapes to form a reduced 3D model.

In some embodiments, the processor is further configured to divide a symmetrical geometric shape into a first half and a second half before adjusting the geometric shape to conform to the subcomponent to which that geometric shape is approximating.

In some embodiments, the processor is further configured to mirror one of the first half and the second half, after adjusting the geometric shape, to make the other of the first half or the second half, and reassemble the first half and the second half to make a reassembled adjusted symmetric geometric shape.

In some embodiments, the processor is further configured to inspect the reassembled adjusted symmetric geometric shape for watertight and manifold consistency.

In some embodiments, the processor performs machine learning to divide the high-poly 3D model into a plurality of subcomponents and approximate each subcomponent of the plurality of subcomponents.

In accordance with an aspect of an embodiment of the invention, there is provided a method of making an optimized 3D model. The method includes: receiving a high-poly 3D model; dividing the high-poly 3D model into a plurality of subcomponents; approximating each subcomponent of the plurality of subcomponents by a geometric shape; adjusting the geometric shape to conform to the subcomponent; merging the adjusted geometric shapes to form a reduced 3D model; and texture mapping the reduced 3D model to provide texture of the high-poly 3D model to form the optimized 3D model.

In some embodiments, the method further includes sharpening edges in the adjusted geometric shapes before merging the adjusted geometric shapes to form a reduced 3D model.

In some embodiments, the method further includes dividing a symmetrical geometric shape into a first half and a second half before adjusting the geometric shape to conform to the subcomponent.

In some embodiments, the method further includes: mirroring one of the first half and the second half, after adjusting the geometric shape, to make the other of the first half or the second half; and reassembling the first half and the second half to make a reassembled adjusted symmetric geometric shape.

In some embodiments, the method further includes inspecting the reassembled adjusted symmetric geometric shape for watertight and manifold consistency.

In some embodiments, the method further includes performing machine learning to divide the high-poly 3D model into a plurality of subcomponents and approximate each subcomponent of the plurality of subcomponents.

In some embodiments adjusting the geometric shape to conform to the subcomponent is constrained by a targeted polygon count and the geometric shape is adjusted to meet the targeted polygon count.

In some embodiments, the method further includes storing the optimized 3D model in one or more databases.

In accordance with an aspect of an embodiment of the invention, there is provided a method of making an optimized 3D model. The method includes receiving a 3D model, scanning the 3D model, creating a provisional point cloud model from the scanned 3D model, recognizing one or more sharp edges in the 3D model to create edge data, combining the edge data with the provisional point cloud model to form a combined 3D model, and remeshing the combined 3D model to form the optimized 3D model.

In some embodiments, when the 3D model is a polygon model, the method further includes reducing the polygon count in the 3D model using quadratic decimation before scanning the 3D model.

In some embodiments, the method further includes determining a 3D model file format of the received 3D model and converting the 3D model file format into a standardized 3D polygon file format using one or more converters selected based on the 3D model file format.

In some embodiments, scanning the 3D model includes scanning the 3D model with a virtual camera and teleporting the virtual camera around the 3D model to find the desired direction and angle to scan the 3D model.

In some embodiments, scanning the 3D model includes extracting lighting and material information about the 3D model using one or more rendering engines.

In some embodiments, recognizing the one or more sharp edges in the 3D model to create the edge data includes i) locating a plurality of polygons in the 3D model, each polygon defining a plane, and ii) for each polygon of the plurality of polygons, determining if an adjoining polygon of the plurality of polygons is at an angle above a set threshold, the angle being measured from the plane of the that polygon to the plane of the adjoining polygon.

In some embodiments, recognizing the one or more sharp edges in the 3D model to create the edge data further includes setting a vertex weight of each sharp edge to a maximum vertex weight.

In some embodiments, recognizing the one or more sharp edges in the 3D model to create the edge data includes setting a vertex color of each sharp edge to white.

In some embodiments, recognizing the one or more sharp edges in the 3D model to create the edge data further includes using computer vision to locate the one or more sharp edges.

In some embodiments, creating the provisional point cloud model from the scanned 3D model includes setting a vertex weight for each point of a plurality of points in the provisional point cloud model based on how important that point is to an overall geometry of the 3D model.

In some embodiments, remeshing the combined 3D model includes removing one or more points of the plurality of points beginning with the one or more points with a lowest vertex weight such that the optimized 3D model meets a set level of reconstruction detail, the set level of reconstruction detail being based on performance capabilities of one or more target platforms on which the optimized 3D model is to be used.

In some embodiments, the method further includes adding detail to the optimized 3D model based on projection mapping extracted from the 3D model, the projections mapping comprising one or more of a normal map, a height map, a smoothness map, a reflectivity map, a metallic map, a gloss map, a bump map, a parallax map, and an extrusion map.

In some embodiments, the method further includes storing the optimized 3D model in one or more databases.

In some embodiments, scanning the 3D model includes adjusting a sample density such that the provisional point cloud model contains a desired level of detail.

In some embodiments, scanning the 3D model further includes, for an area on the 3D model where more detail is desired, adjusting the sample density to a higher sample density relative to an average sample density.

In accordance with a further aspect of an embodiment of the invention, there is provided a method of providing a 3D virtual reality experience. The method includes i) importing an asset file, ii) optimizing the asset data, iii) setting up the 3D virtual reality experience, and iv) exporting and distributing the 3D virtual reality experience.

In some embodiments, importing an asset file includes i) determining a type of asset file, ii) determining a type of asset data to be imported based on the determined asset file type, iii) importing the asset data using one or more file importers selected based on the determined type of asset data, and iv) storing the asset data is a data sterilization format.

In some embodiments, optimizing the asset data includes i) converting the asset data into a standard format, ii) optimizing the asset data using optimizers selected based on the type of asset data, iii) storing the optimized asset data in one or more databases, and iv) referencing the location of the optimized asset data within the one or more database.

In some embodiments, setting up the 3D virtual reality experience includes i) placing the optimized asset within a 3D landscape, ii) attaching one or more interactive modules to the optimized asset data, and iii) storing the 3D virtual reality experience on one or more 3D virtual reality experience servers.

In some embodiments, exporting and distributing the 3D virtual reality experience includes i) determining a suitable virtual reality platform based on performance requirements, and ii) providing the 3D virtual reality experience to a user upon a request by the user to load the 3D virtual reality experience to the determined suitable virtual reality platform.

In accordance with a further aspect of an embodiment of the invention, there is provided a system for making an optimized 3D model. The system includes i) a processor, ii) a database coupled to the processor, and iii) a communication interface coupled to the processor, the communication interface communicatively coupled to at least one user system. The processor is configured to: receive, for the at least one user system a 3D model, scan the 3D model, create a provisional point cloud model from the scanned 3D model, recognize one or more sharp edges in the 3D model to create edge data, combine the edge data with the provisional point cloud model to form a combined 3D model, and remesh the combined 3D model to provide the optimized 3D model; and store the optimized 3D model in the database.

In some embodiments, the processor is further configured to: receive, from the at least one user system, a request to load a desired optimized 3D model; and in response to receiving the request, retrieve from the database the desired optimized 3D model and transmit the desired optimized 3D model to the at least one user system.

In accordance with an alternative aspect of an embodiment of the invention, there is provided a method of making an optimized 3D model. The method includes: receiving a high-poly 3D model; dividing the high-poly 3D model into a plurality of subcomponents; cleaning a topology of the subcomponent; poly-reducing the cleaned subcomponent; shrink wrapping the poly-reduced subcomponent by placing it over that subcomponent; and merging the shrink wrapped subcomponents to form the reduced 3D model.

In some embodiments, the method further includes texture mapping the reduced 3D model to bring back a texture of the high-poly 3D model.

In some embodiments, the method further includes storing the reduced 3D model in one or more databases.

In some embodiments, cleaning a topology of the subcomponent includes: fixing tessellation problems by one or more of filling holes, filling concave faces, splitting N-gons into quads or triangles, and removing lamina faces; merging stacked vertices; deleting isolated vertices; and deleting non-manifold geometry.

In some embodiments, poly-reducing the cleaned subcomponent includes a first poly-reduction and a second-poly reduction, the second poly-reduction having a higher reduction rate than the first poly-reduction.

In some embodiments, the method further includes inspecting each poly-reduced subcomponent for topological flaws and fixing discovered topological flaws before shrink wrapping the poly-reduced subcomponent.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of methods of the present specification. In the drawings.

DETAILED DESCRIPTION

Figure 1:
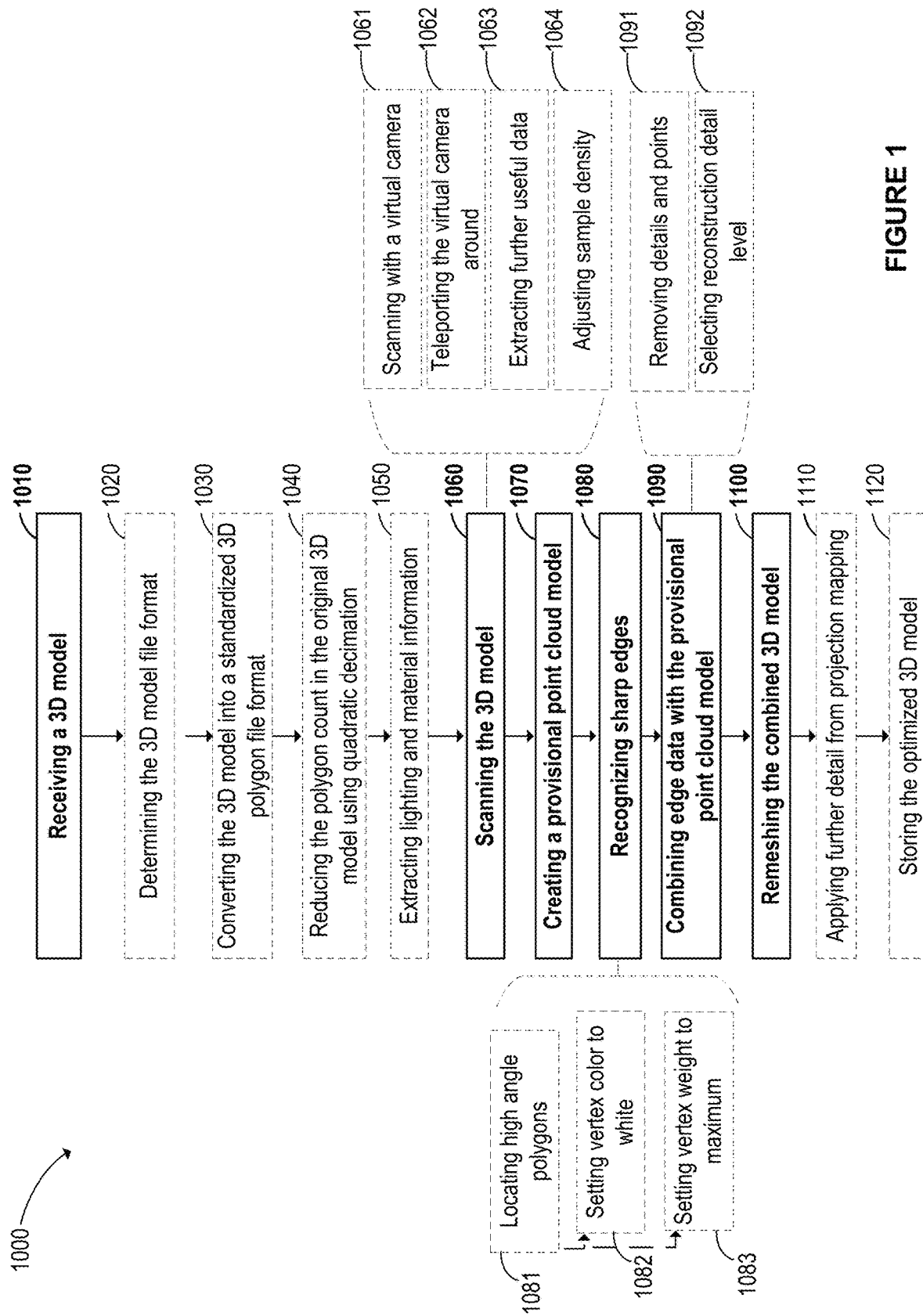
FIG. 1 is a flow chart of a method of providing an optimized 3D model, in accordance with an embodiment.

Various embodiments are described to provide examples of the claimed methods. No embodiment described below limits any claimed method, and any claimed method may cover processes that differ from those described below. The claimed methods are not limited to processes having all of the features of any one process described below, or to features common to multiple or all of the processes described below.

One or more methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

In some embodiments, one or more methods described herein may be implemented on a server system, including a web-based servers system, comprising servers networked to one another, and may include remove servers, mobile devices, gaming consoles, personal computers and other computing devices. One or more steps of one or more method may be performed on a server, including a remote server, while one or more steps of one or more method may be performed on a user device. A user device may include any device controlled by a user of an optimized VR experience, wherein the VR experience may include a single 3D model or a VR experience including multiple 3D models. In some embodiments a user device may be a local device such as a gaming system or mobile device. In some embodiments, one or more method may be substantially performed on a single computing device.

When a single model or modeled object is described herein, more than model or modeled object (whether or not they cooperate) may be used in place of a single model or modeled object. Where more than one model or modeled object is described herein (whether or not they cooperate), a single model or modeled object may be used in place of the more than one model or modeled object. For example, where a method is described in relation to a single 3D model of single modeled object, the method may also be applied to optimize multiple objects, multiple models, and entire VR experiences, and may also optimize 3D models extracted from larger VR experiences.

Figure 12:
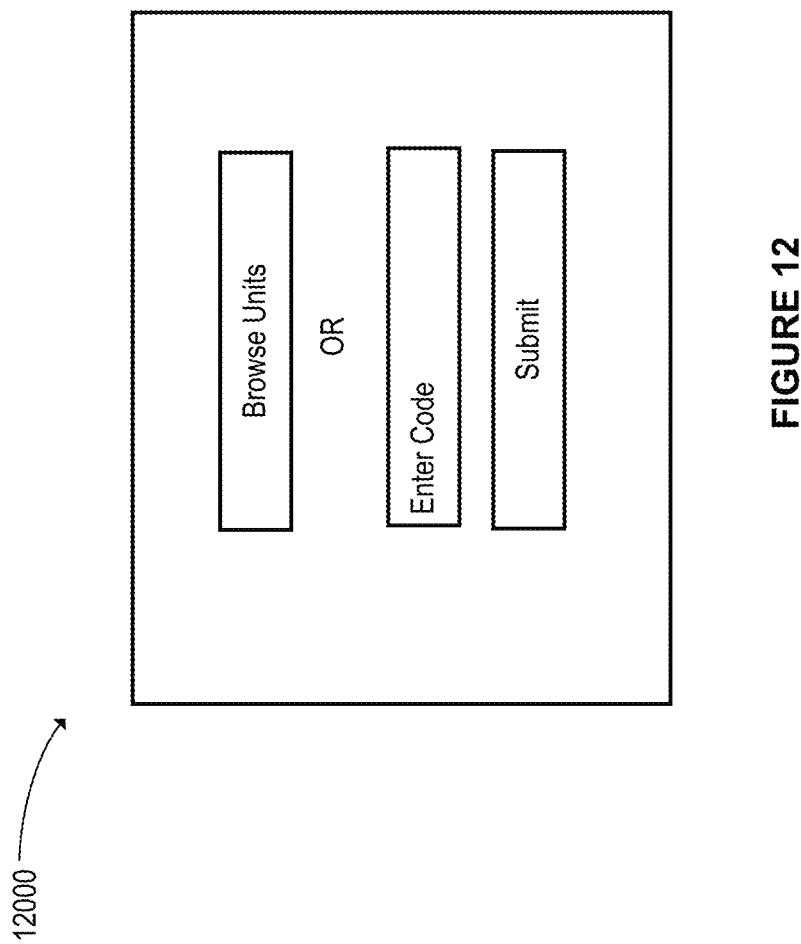
FIG. 12 is a screenshot of an interface to access a VR experience from a web server, in accordance with an embodiment.

FIG. 1 shows a block diagram illustrating an embodiment of a method of making an optimized 3D model 1000, in accordance with an embodiment. The method 1000 may be applied to a 3D model in order to compress the 3D model. The optimized 3D model may enable complex VR experiences to be experienced on platforms which may not otherwise be capable of handling the uncompressed 3D model. The method 1000 may be with receiving a 3D model 1010. The method may include receiving an asset through a variety of input options. Input options may include a web dashboard or a downloadable uploader, and may also include a custom interface or program. For example, FIG. 12 depicts a screenshot of a sign in page, which a user may use to access a web dashboard, downloadable uploader, or custom interface or program. This is an interface to access the experience from the web server. The link may be public, private or unlisted.

Figure 2:
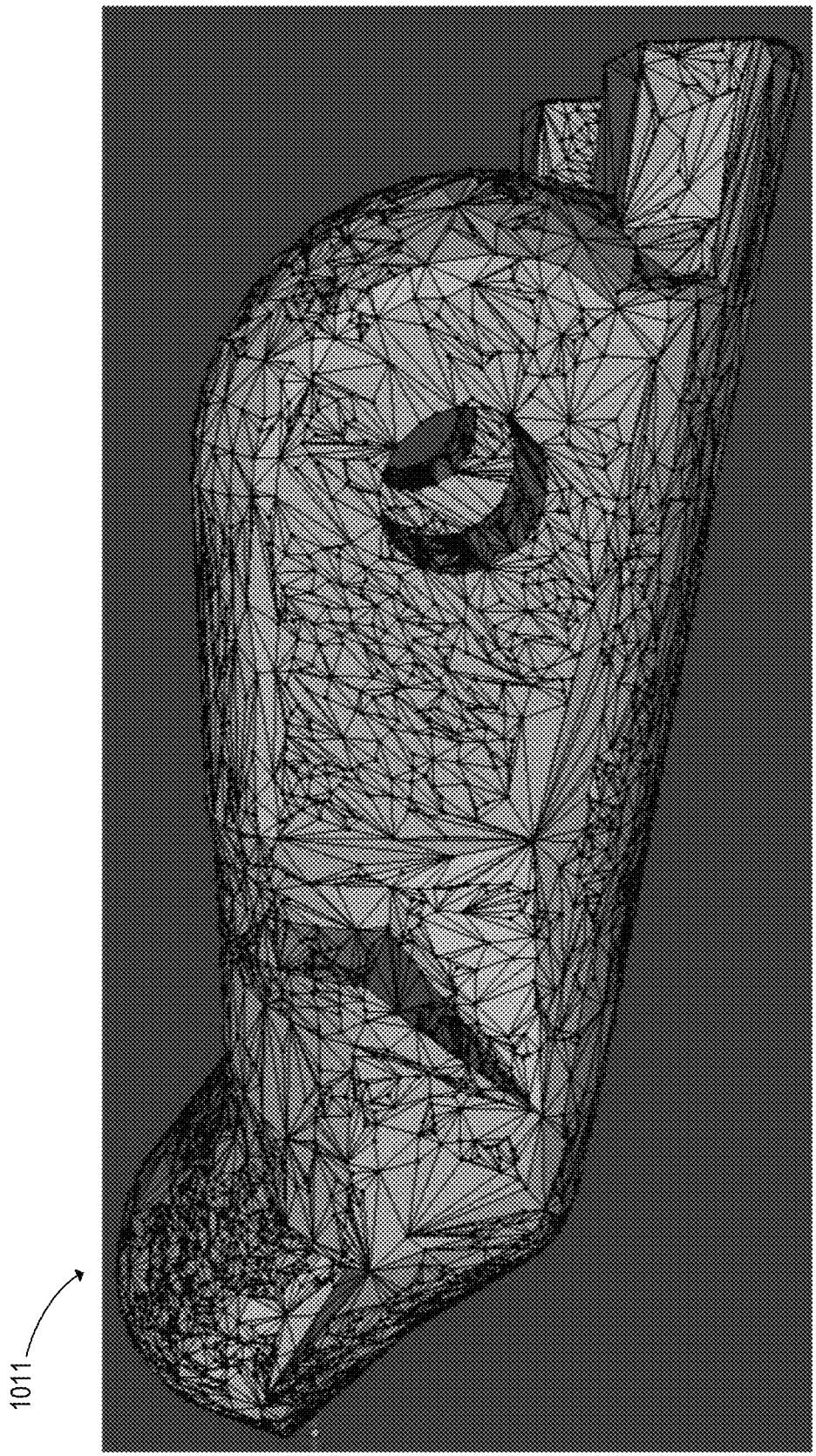
FIG. 2 is an image of an example computer aided design (CAD) model which may be optimized.

The method may include dynamic receiving, capable of receiving 3D models from many file types. For example, as shown in FIG. 2, a computer-aided design (CAD) model 1011 may be revived from object files. The CAD model 1011 may include a set of mesh data, such as, for example, polygon mesh data or triangle mesh data. Object files may be fbx files, non-uniform rational basis spline (NURBS) data that is received from computer-aided design (CAD) file formats such as standard for the exchange of product model data (STEP), Initial Graphics Exchange Specification (IGES), or SoLiDworks PaRT (SLDPRT) files. Point cloud data may be received from 3D scanned files such as Point Cloud Data (PCD) or Polygon File Format (PLY) files, or voxel data is received from Blender Voxel (BVOX) files.

In addition, it is to be understood that receiving a 3D model may include receiving asset data which may be transformed into a 3D model (or, as mentioned above, transformed into a VR experience comprising 3D models) which is scanned as described below. For example, the method may include receiving a 3D scan rather than a 3D model, which is remeshed into a 3D model to form a surface which can be scanned.

Having received a 3D model, the method may include determining the 3D model file format 1020 and converting the 3D model into a standardized 3D polygon file format 1030 using one or more 3D model file converters. For example, the one or more 3D file converts may be selected based on the 3D model file format. For ease of use, the data may be converted to, and stored in a serialization format such as JavaScript Object Notation (JSON) or Extensible Markup Language (XML). This may enable the method to be applied without requiring a user to restrict input to a particular file type.

The method may include applying processing directly to a received 3D model without determining file type or converting the model into a standardized polygon file. For example, where the method is used with a known file format, the method may not need to include determining the 3D model file format and converting to a standardized file format.

In some embodiments, in addition to the data defining the basic 3D model, the method includes extracting further useful data, where available. For example, the method may include extracting and storing Building Information Modeling (BIM) information from a Revit file, layer information from an AutoCAD file, selection set and instance data from Filmbox (FBX) file, textures information, lighting information, or materials information 1050.

In some embodiments, receiving and extracting data is accomplished through a variety file importers, with the applied algorithm corresponding to the file import format. In other embodiments, receiving and extracting data may be accomplished through a custom application program interface (API) or a custom software development kit (SDK). Received and/or extracted data may be stored for further use.

Figure 3:
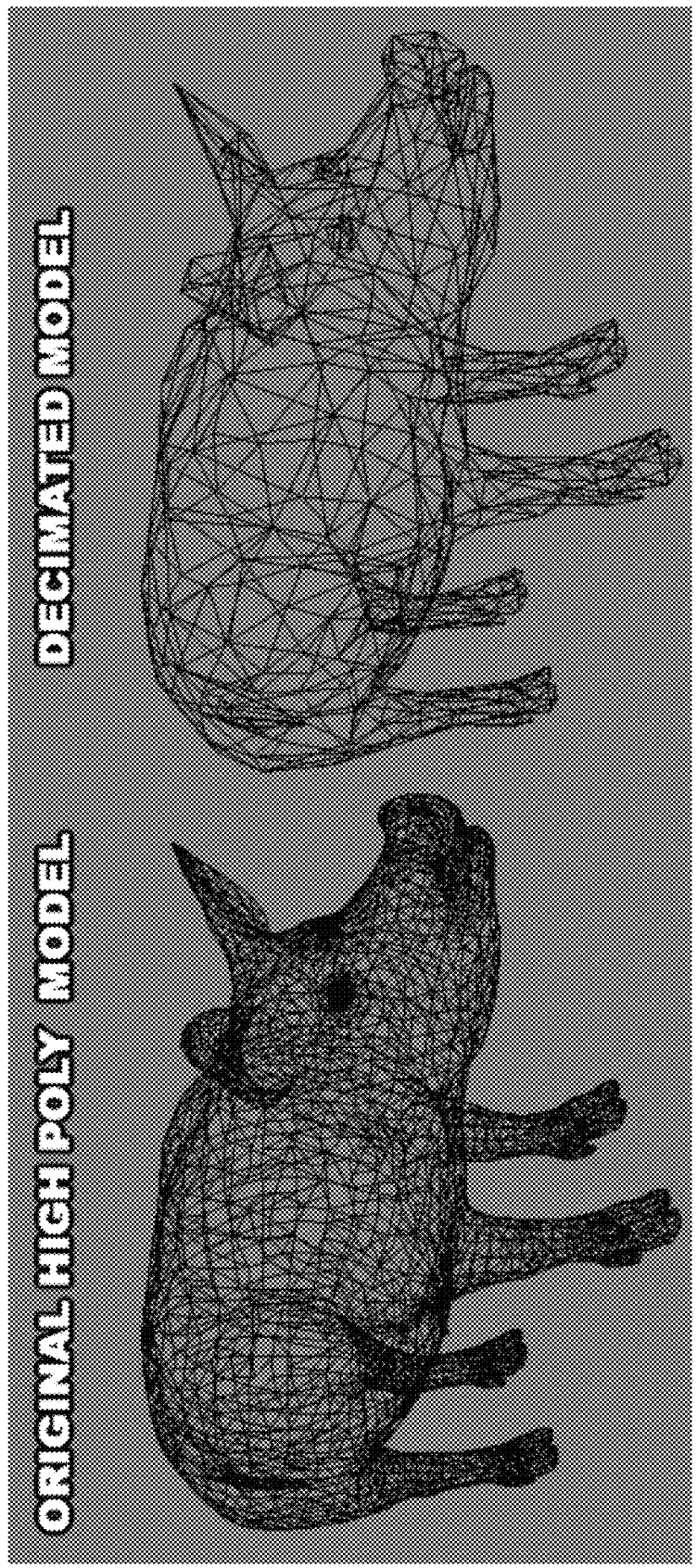
FIG. 3 is an image of an example 3D polygon model showing the model before and after decimation.

Having received a 3D model, the method may include optimizing the model. The method may include applying a preliminary optimization. For example, where a received 3D model contains, or has been translated to contain, polygon data, the method may include reducing the polygon count using quadratic decimation 1040. For example, FIG. 3 depicts a 3D polygon model before decimation 1041 and after decimation 1042.

In other embodiments, the method does not include the preliminary optimization. For example, the preliminary optimization may reduce the quality of the data or result in an optimized 3D model which requires further processing.

Figure 4:
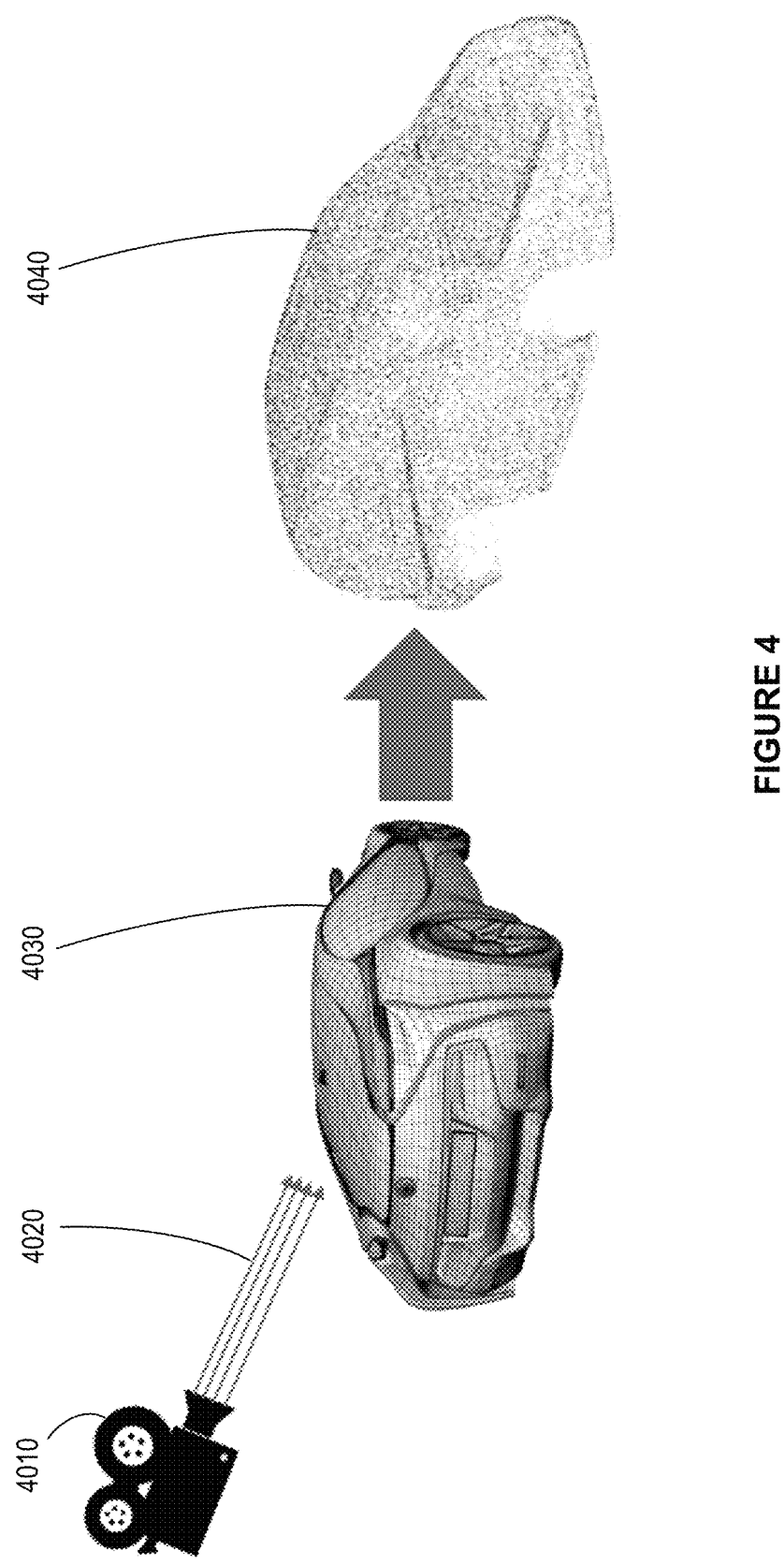
FIG. 4 is a flow chart of a virtual camera sampling the surface of a 3D model to create a provisional point cloud model.

The method may include scanning the 3D model 1060, by taking samples from the surface of a 3D model. The scan may be a 3D scan taken by a virtual camera 1061 facing the model and sampling the surface of the 3D model. The scan creates a provisional point cloud model 1070. For example, as depicted in FIG. 4, a virtual camera 4010 may scan a 3D model 4030 by sampling 4020 the surface of the 3D model 4030 to create a point cloud model 4040.

The virtual camera reads the 3D file as a 2D image. This may include a computer screen, a virtual screen (such as top view of a 3D model), a perspective camera view etc. The virtual camera may be a camera object inside a 3D modeling software such as a 3ds Max™.

Using a virtual camera to create a provisional point cloud model of a 3D model may provide certain benefits. A virtual camera can be 'teleported' about the model 1062 to sample the model from any desired angle and direction. In addition a virtual camera may not suffer from problems such as sensor drifts and the inclusion of noise samples that would be encountered with a conventional sensor camera.

In some embodiments, extracting further useful data 1063 is also partially performed during the scan. For example, the scan may include rendering engines to read out lighting information or may be applied to determine the material of the 3D model.

In some embodiments, the level of detail in the provisional point cloud model is adjusted by adjusting a sample density when scanning the 3D model 1064. For example, the sample density may be set or adjusted such that the provisional point cloud model contains a desired level of detail. In some embodiments, in one or more areas of the 3D model where more detail is desired, the sample density is set at a higher sample density relative to an average sample density of the 3D model.

The method may also include recognizing one or more sharp edges in the 3D model 1080 to create edge data. Recognizing sharp edges 1080 may allow the quality of the image to remain high, as the defining lines remain clean and well defined, which may allow the optimized 3D model to hold more accurate shape with less fine detail.

Recognizing sharp edges 1080 may include locating a plurality of polygons in the 3D model, each polygon defining a plane. For each polygon of the plurality of polygons it may be determined if an adjoining polygon of the plurality of polygons is aligned at an angle above a set threshold 1081. The angle may be measured from the plane of that polygon to the plane of the adjoining polygon. In some embodiments, recognizing sharp edges 1080 includes employing computer vision, such as the Canny Edge Detector, to locate sharp edges having an angle greater than a defined threshold. In some embodiments, recognizing sharp edges includes setting a vertex color of each sharp edge to white 1082. In some embodiments, recognizing sharp edges includes setting a vertex weight of each sharp edge to a maximum vertex weight. For example, each sharp edge may be set to a vertex weight of one (1).

Figure 5:
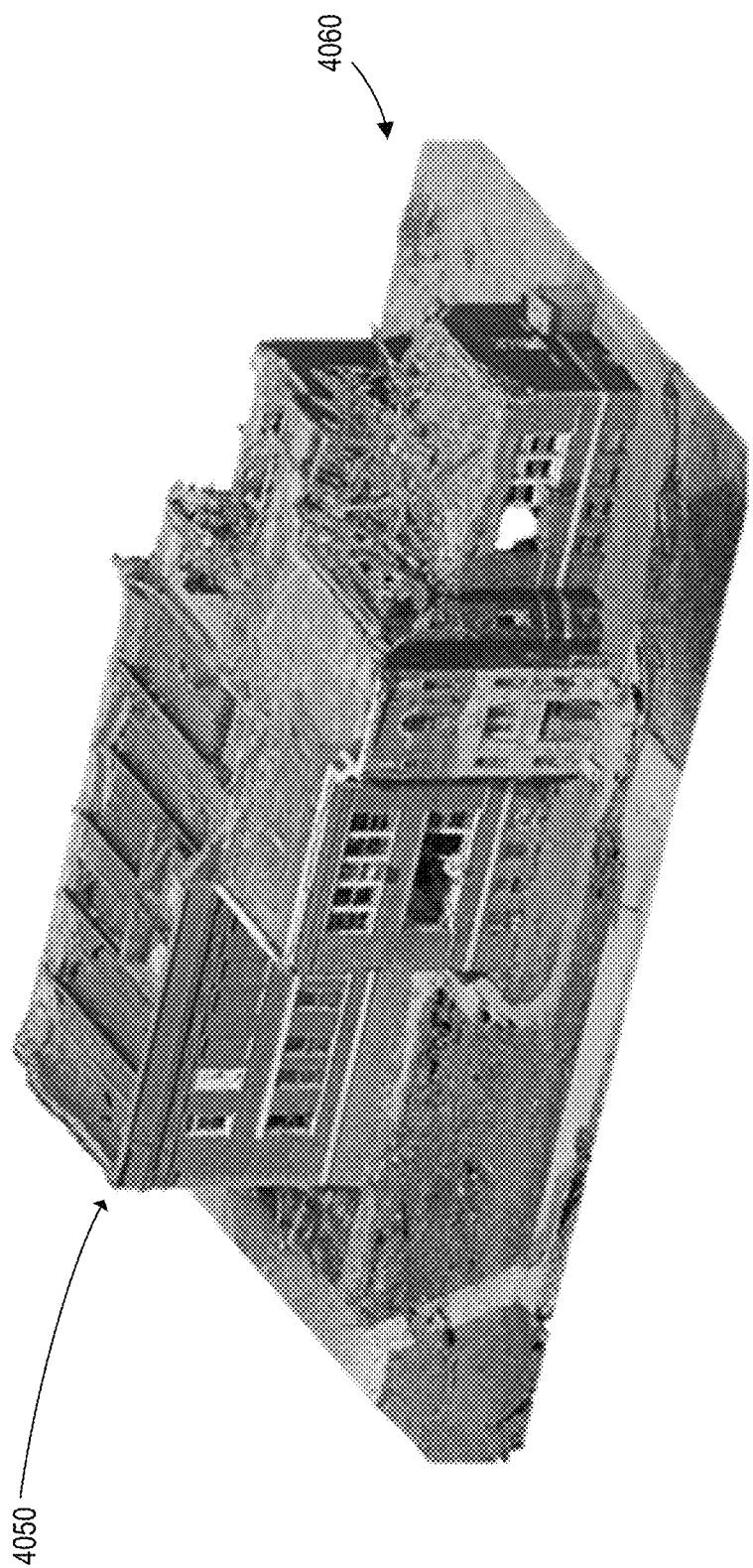
FIG. 5 is an image of an example 3D model.

The vertex weight of each point of a plurality of points in the provisional point cloud may be set to account for the importance of that point to the shape of the 3D model. Points detected as edge points may be set to the maximum vertex weight. The vertex weight of the points (i.e. non-edge points) may be set based on how much they contribute to the overall geometry. For example, the vertex weight for a non-edge point may be determined based on how far the point is from an edge and whether the point is on a curved surface or a flat surface. As shown in FIG. 5, the vertex weight of points near edges or in high detail areas 4050 may be set to a higher value, with sharp edges set to the maximum vertex weight 1083 to prevent the edges from being smoothed out during further processing, such as during remeshing of the combined 3D model. The vertex weight of points in low detail areas 4060 may be set to a lower value so that these points will be the first to be removed during further processing.

In some embodiments, points with a low vertex weight are removed while points with the maximum vertex weight are retained to ensure that the reconstructed mesh has the appropriate level of detail.

Having extracted edge data defining sharp edges, the edge data may be combined with the provisional point cloud model 1090. In some embodiments, depending on the level of detail required for the optimized 3D model, points are removed from the combined 3D model 1091. For example, points may be removed beginning with the one or more points with a lowest vertex weight. In some embodiments, a reconstruction detail level can be selected for the optimized 3D model 1092. For example, the reconstruction detail level the set level may be based on performance capabilities of one or more target platforms on which the optimized 3D model is to be used. In these embodiments, points are removed beginning with the one or more points with the lowest vertex weight until the reconstruction detail level is met. In this way, the optimized 3D model may be compressed as much as possible while still meeting the reconstruction detail level.

Figure 6:
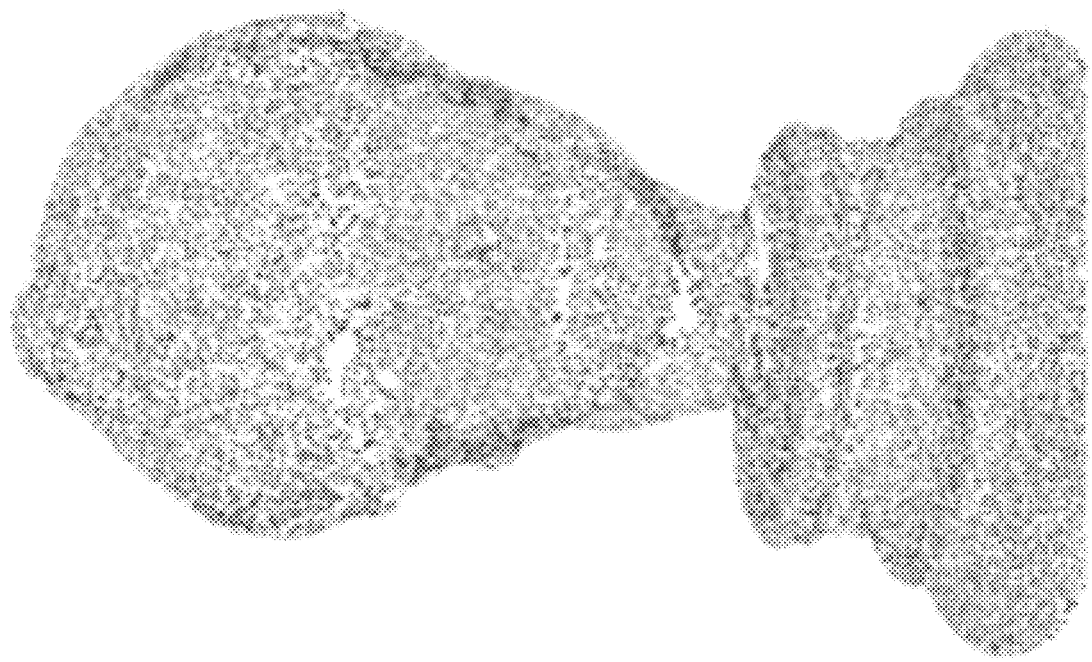
FIG. 6 is an image of an example point cloud model.
Figure 7:
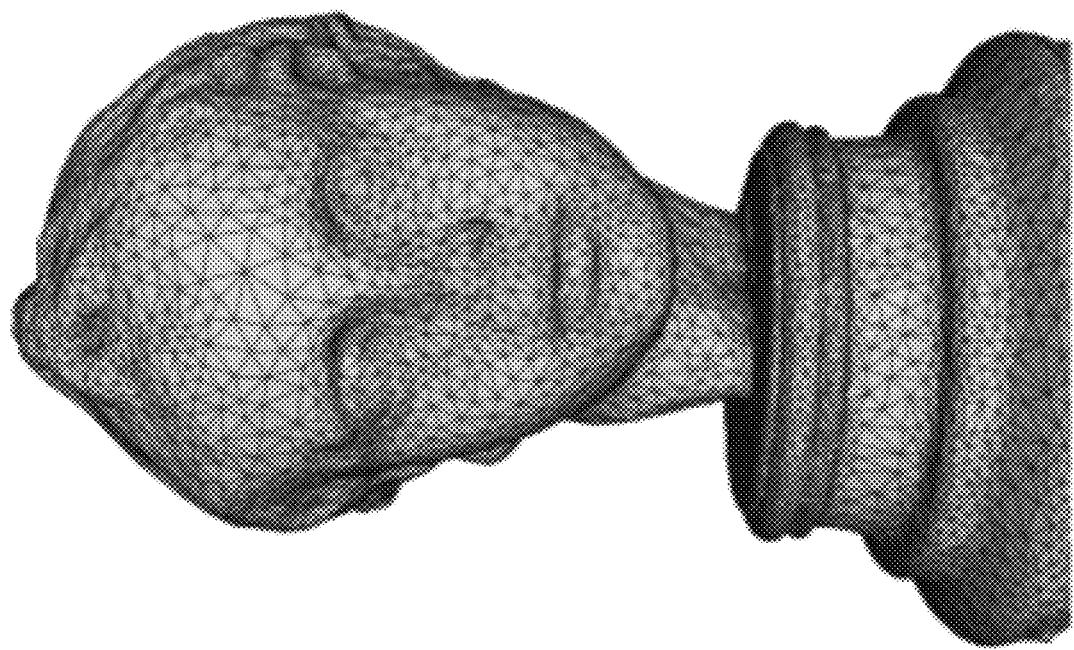
FIG. 7 is an image of a remeshed 3D model of the point cloud model of FIG. 6.

The combined 3D model may be remeshed to provide the optimized 3D model 1100. The remeshing may include a poisson surface reconstruction remesher. For example, as illustrated in FIGS. 6 and 7, a provisional point cloud model combined with edge data 4070 may be remeshed into a triangle mesh 3D model 4080.

The optimized 3D model can also be qualified by a user, for example, by labelling which parts have too much detail left and which parts have too little. A machine learning module map apply this manually entered information to fine tune the variables used to process the optimized 3D model, such as detail thresholds and vertex weight distribution, to adjust for better accuracy in subsequently processed models.

In some embodiments, further details are applied to the optimized 3D model via projection mapping 1110. For example, projection mapping may provide a normal map and/or a height map extracted from the 3D model. The normal map and/or the height map may be applied to the optimized 3D model to add further detail. In addition to the normal map and the height map, the projection mapping may also provide one or more of a smoothness map, a reflectivity map, a metallic map, a gloss map, a bump map, a parallax map and an extrusion map are other possible formats to pass down complex information. Although the normal map and the height map may provide sufficient detail for the purpose of increasing the overall detail of the optimized 3D model, any of the aforementioned maps based on the projection mapping may be used to provide additional detail.

In some embodiments, the required detail, such as the amount of detail added by the normal map and/or the height map or the amount of detail achieving in remeshing the combined 3D model, are determined based on the performance capabilities of a target platform. For example, when remeshing the combined 3D model 1100, small details may be removed to reduce the polygon count.

In some embodiments, the optimized 3D model is stored in one or more databases 1120 for future use. For example, the optimized 3D model may be stored on a web server, and may be formed into specialized model libraries which are ready for VR use.

Figure 8:
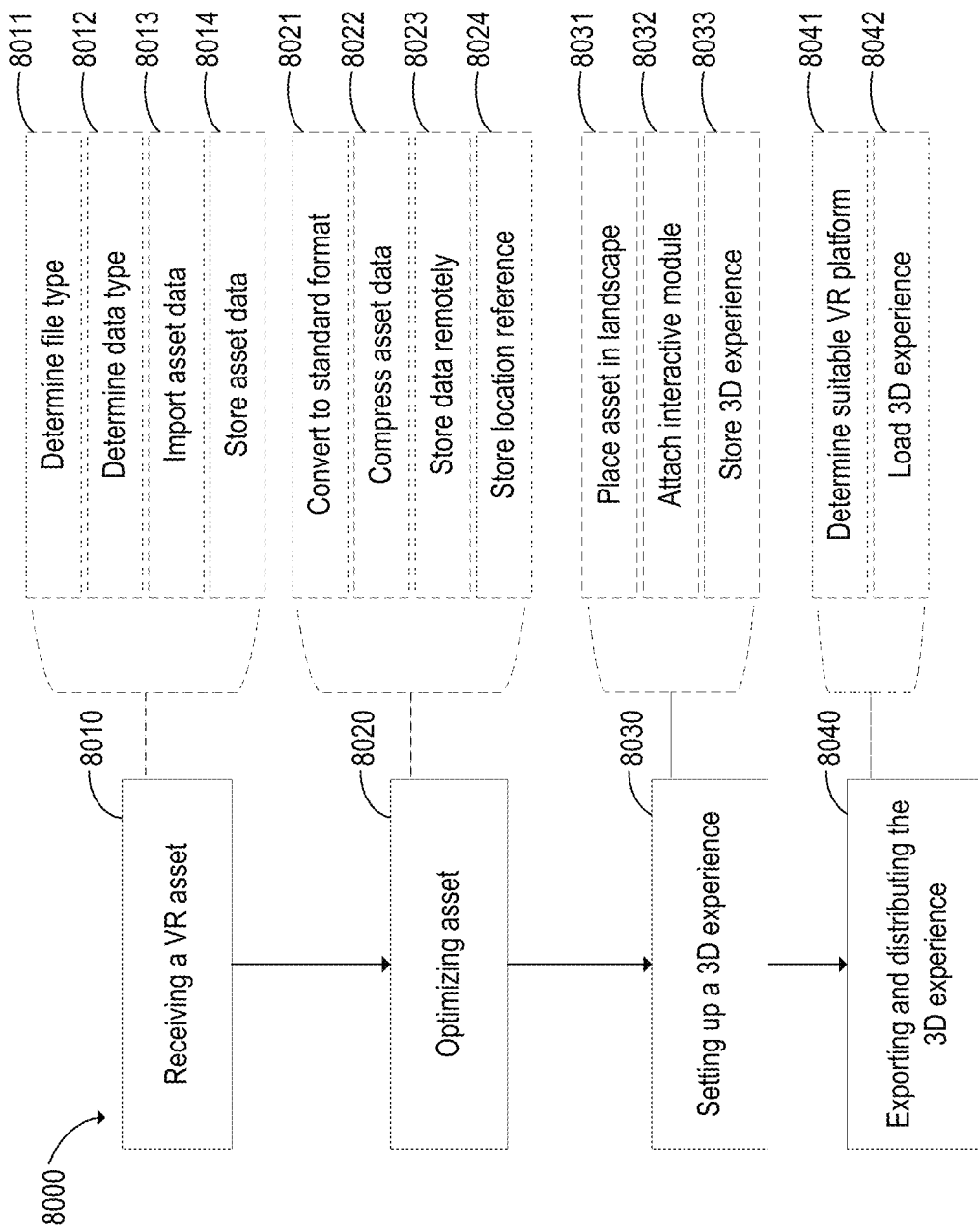
FIG. 8 is a flow chart of a method of providing a 3D virtual reality experience, in accordance with an embodiment.
Figure 9:
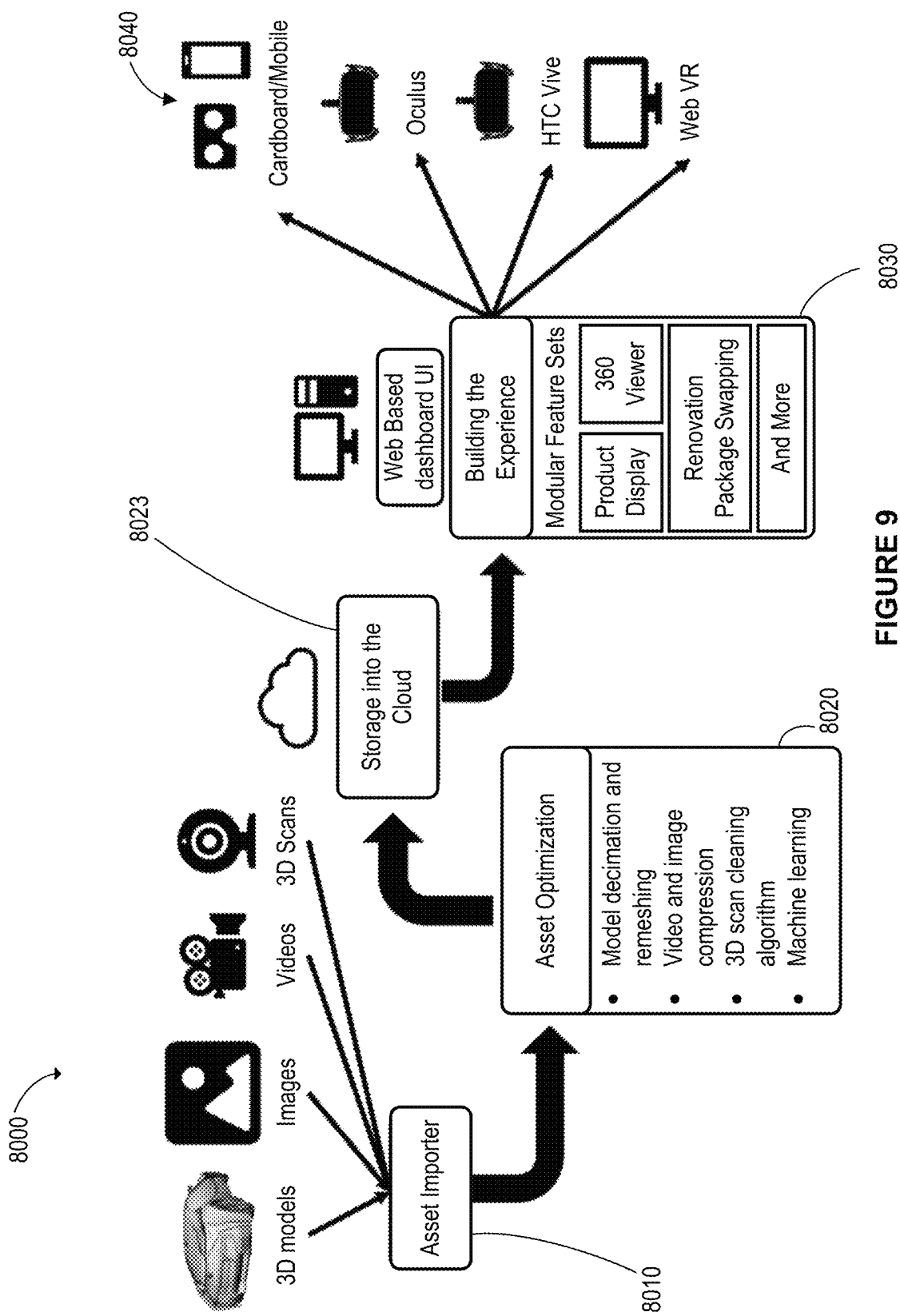
FIG. 9 is a flow chart of the method of providing a 3D virtual reality experience shown in FIG. 8 with additional features.
Figure 10:
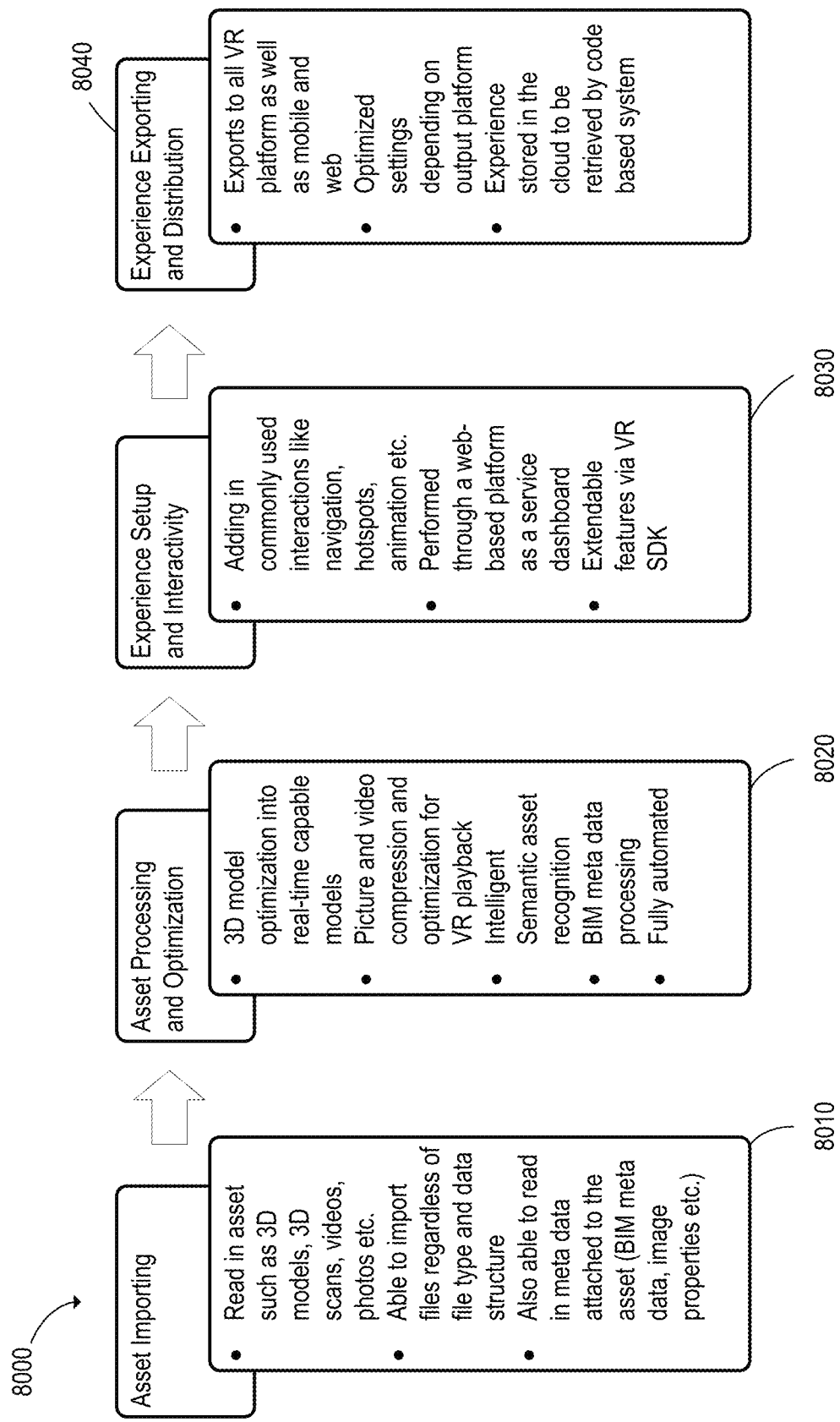
FIG. 10 is a flow chart of the method of providing a 3D virtual reality experience shown in FIG. 8 with additional features.

FIGS. 8 to 10 show flow charts of a method 8000 for providing a 3D VR experience. The 3D VR experience may include one or more VR assets, such as a 3D model, a sound file, video file, photo file, or text file. The method may include receiving a VR asset 8010, optimizing the asset 8020, setting up a VR experience 8030, using the optimized VR asset, and exporting and distributing the VR experience 8040.

Many aspects of importing a 3D VR asset 8010 and optimizing the VR asset 8020 have been described above, particularly as these step apply to receiving and optimizing a 3D model.

The method may import an asset file 8010 by receiving an asset file through a web dashboard, downloadable uploader, or other custom interface, such as web dashboard 7020. However, importing an asset file 8010 may also include reading in assets other than 3D models or data which can be transformed into a 3D model. In some embodiments, the method also import videos, photos, or other assets. The method may include recognizing a file type 8011, determining the data type 8012 based on the file type, and using one or more known file importers or proprietary API or SDK, selected based on the determined asset data type, to import the asset data 8013, and storing the asset data in a serialization format 8014.

In addition to the described 3D model optimization, optimizing the asset data 8020 may include optimizing videos, images, text, and other assets. For example, the method may employ video, image, and text optimizers and 3D scan cleaners. For example, video may be compressed using VP8 or H.264, audio may be compressed using Vorbis, sound files may be compressed using Vorbis, and images may be stored in jpeg format. In addition, the method may include machine learning to optimize asset data as described above.

In some embodiments, optimizing asset data includes converting the asset data into a standard format 8021, compressing the asset data 8022 using one or more of the methods described above with reference to both 3D models and other assets, storing the asset data on one or more remote servers 8023, and referencing the location of the optimized asset data within one or more databases 8024. For example, the one or more databases may be one or more remote servers. Remote servers may include web servers like AWS or Azure, and optimized assets may make up specialized model libraries ready for VR use.

The method of creating the 3D virtual reality experience may also include setting up a 3D VR experience 8030. Setting up the 3D VR experience 8030 may include placing optimized assets into 3D VR landscapes 8031, attaching interactive modules to the optimized assets 8032 and storing the 3D experience on one or more 3D VR experience servers 8033. In some embodiments, setting up a 3D experience 8030 takes place before an asset is optimized, and the asset optimization step 8020 is applied to the created landscape.

Interactive modules may include a variety of interactive features. For example a 'door' asset may have an 'open door' module attached to allow the door to be opened as a door in a VR experience. Interactive modules may be added automatically, and selected based on machine learning and the recognition of objects defined by the asset data. In addition, in some embodiments, interactive modules depend on one another, and adding one module to an asset automatically results in other modules being added to the asset as well.

The modules may include a navigation module for enabling a user to move or teleport around assets in a VR experience. The modules may include a hand module for providing hand movement and interactions with a VR environment. Customization modules may permit a user to change aspects of the VR environment while immersed in the VR environment, such as changing the color or texture of an asset, or replacing one model of an asset with another. Alternatively, in some embodiments, new modules are made using an SDK.

Differences in the capabilities of a target VR platform may determine not only the extent of optimization but also the complexity of interactivity modules which the platform may support. As a result, the requirements of a target VR platform may determine which interaction modules are added to an asset, or may determine which of the added modules are activated or available when a VR experience is executed on a particular VR platform. For example, hand tracking may be supported on a platform that supports hand tracking. Other platforms may offer a point and click interface without hand tracking.

The method may also include exporting and distributing the 3D experience or 3D model 8040. This system accepts a user selection of a VR platform, and may include determining suitable VR platforms 8041, which may restrict a user's ability to select a platform. The settings of different interactivity modules may be adjusted depending on the output platform's capabilities.

In addition, the graphics settings may also be adjusted depending on the output platform, to ensure performance levels are maintained. Adjusting graphics levels may include applying asset optimization after a user chooses a platform, or applying certain steps or sub steps again to an already optimized asset, such as a 3D model stored in a specialized library. This further optimization may apply all or only a subset of the optimization method. For example, this further optimization may only apply known polygon reduction methods rather than rescanning an asset or 3D model and optioning a point cloud model and sharp edge data.

In some embodiments, once a built experience is chosen and finalized for a particular VR platform, the 3D VR experience is stored on a remote server, such as the remote servers mentioned above, and is accessed via API calls. A mobile or other application may be provided for a specific platform which will load the built 3D VR experience via an http request to the server 8042. For example, the built 3D VR experience may downloaded from the server using a code based system in which a user enters a code to download the targeted experience to run it locally on the user device.

In some embodiments, to provide a number of pre-downloaded experiences, the downloaded experience is cached locally on a user device. This cache may have a limit, in which case the oldest experience will be deleted and is then be downloaded again for a subsequent use.

In some embodiments, creating a 3D experience includes providing the required 3D assets and setting parameters, and leaving the experience to be automatically built by a viewing platform from the assets and parameters.

Figure 11:
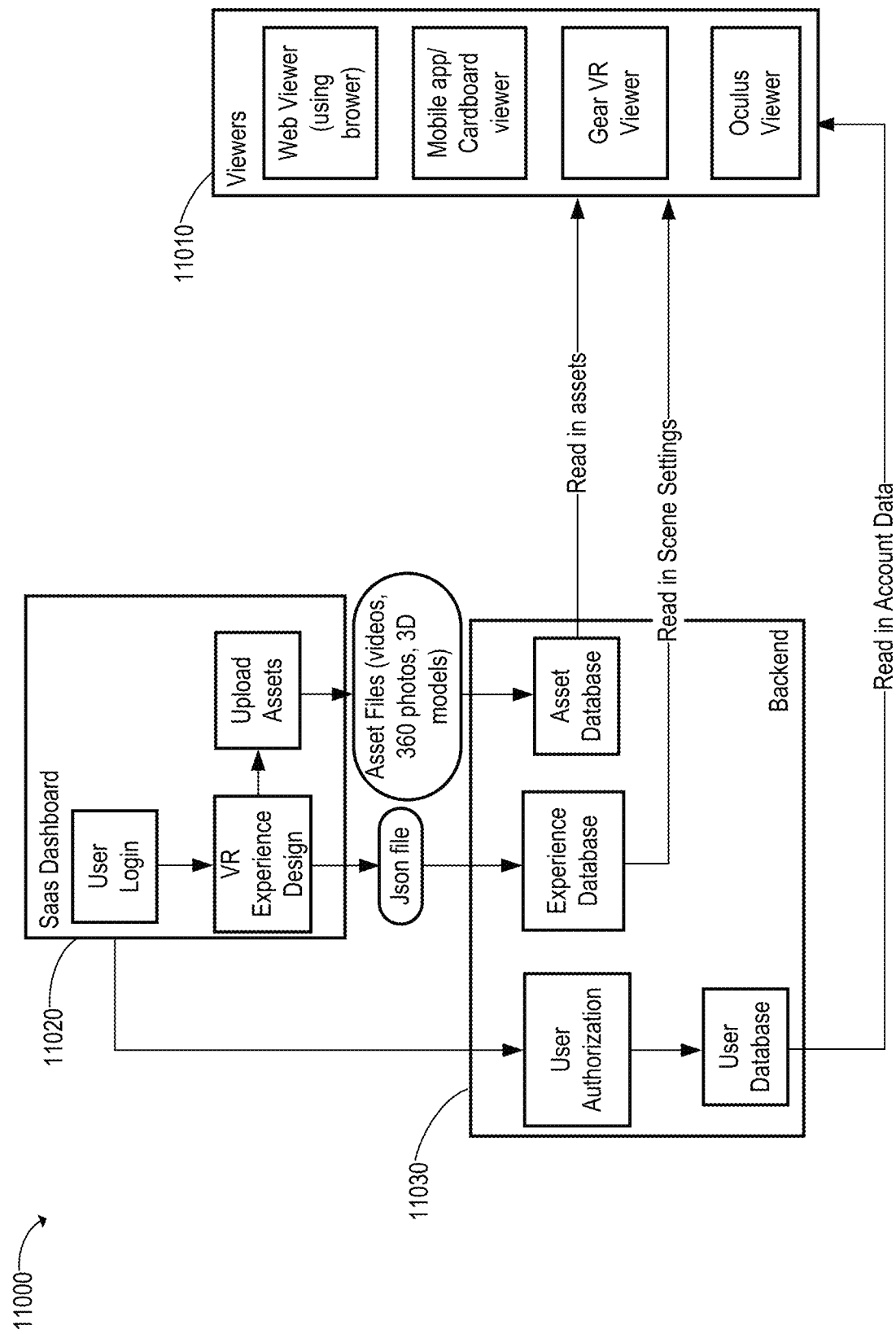
FIG. 11 is a block diagram of a system showing components interacting with 3D content stored in a backend database, in accordance with an embodiment.
Figure 13:
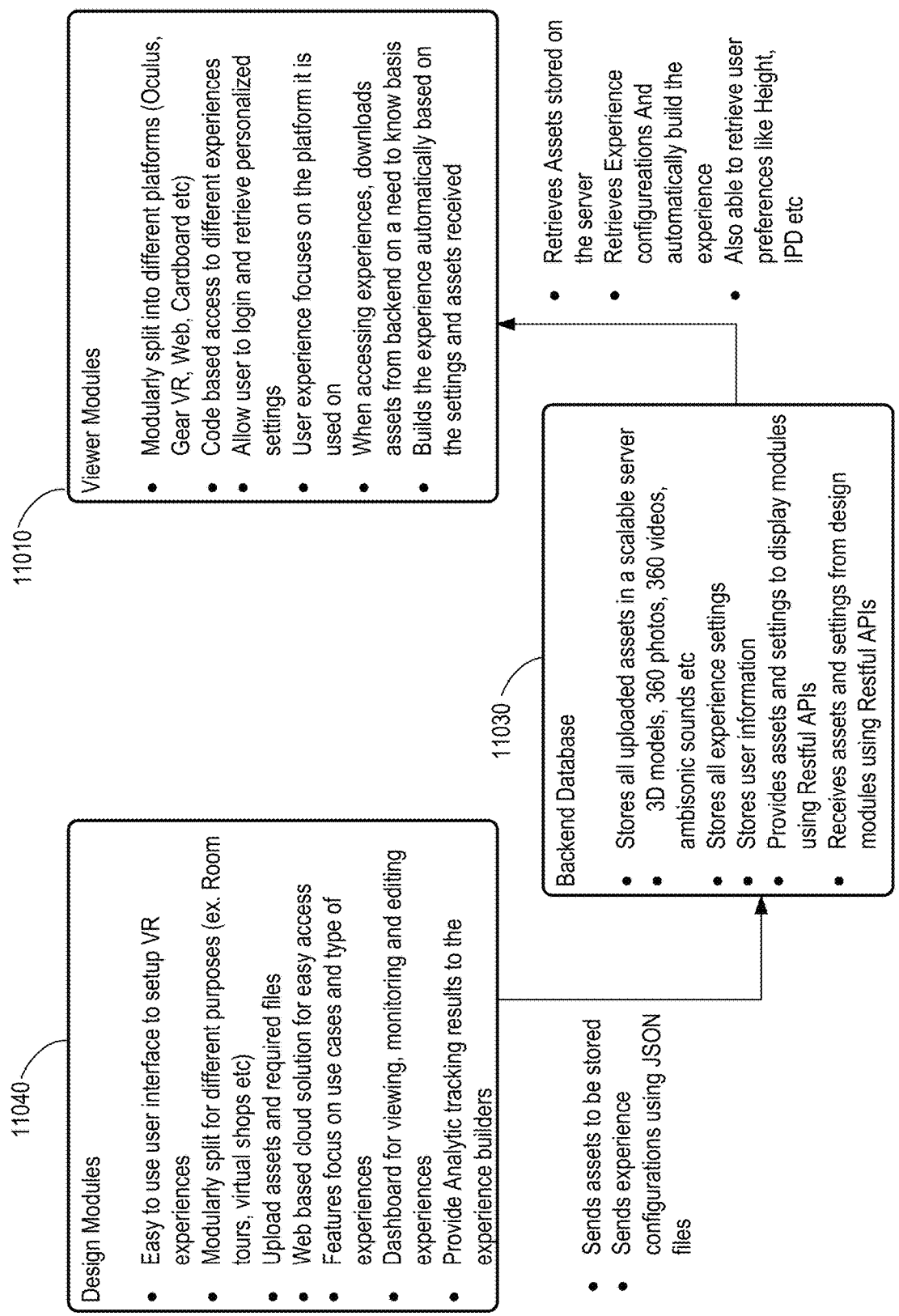
FIG. 13 is a block diagram of the system of FIG. 11 showing the additional components.

Reference is now made to FIGS. 11 to 13 which illustrate a VR optimization system 11000, in accordance with an embodiment. The system 11000 may be used to provide an optimized 3D model, as described above, and/or create a 3D VR experience. System 11000 may include a user device 11010, such as a web viewer, mobile phone 3D viewer, or more integrated 3D viewer such as a Gear VR™ Viewer or Oculus™ VR viewer. System 11000 may also include a processor (not shown), for performing the methods described herein.

The processor may be configured to receive a 3D model for optimization, and may be configured to provide a web dashboard 11020. For example, the web dashboard 11020 may permit a user to log in, such as through an access point 12000 as depicted in FIG. 12, to design a 3D VR experience. In some embodiments, the web dashboard 11020 uploads an asset such as a 3D model, image, text file, video, or sound file. The access point 12000 provides access to the VR experience. The system may include a separate login system to limit the user's ability to access private content.

System 11000 may also include a backend server 11030. Backend server 11030 may include an asset database, such as an optimized asset database and an unoptimized asset database. Backend server 11030 may include an experience database for storing VR experiences created as described herein, and for storing experiences which have been uploaded or otherwise selected. Backend server 11030 may include a user database for storing information about registered users, including information concerning user usage.

System 11000 may include a communications module (not shown) for facilitating communication between components of the system 11000. Communications module may permit communication between user device 11010 and backend server 11030, and may permit a user device 11010 to request an optimized 3D model or VR experience stored in backend server 11030, and may provide the user with the requested data. The web dashboard or other interactive interface 11020 may provide, or be provided through, one or more design modules 11040, and the dashboard or other interactive interface 11020 may permit a user to view, monitor and edit 3D experiences, such as 3D experiences created through design modules 11040. Design modules 11040 may be provided modularly for different purposes or desired 3D experiences. For example, a design module may be provided for the creation of a 3D room tour experience, another design module may be provided for the creation of a 3D virtual shopping experience, etc.

Design modules 11040 may be provided as web based cloud solutions for easy access to permit a user to easily access and set up a VR experience by uploading assets and required files and providing a variety of features as described herein, which may include features permitting a user to set the 3D experience parameters. Design modules 11020 may also provide analytic tracking results to experience builders, such as providing experience builders with information concerning the number of users accessing experiences and how users interact with the experiences.

While design modules 11040 may permit a user to create or optimize a VR experience or asset, one or more viewer modules 11010 may permit a user to use experiences or assets. View modules 11010 may be modular, and based on the user's platform. For example, a viewer module may be provided for the Oculus™ platform, a viewer module may be provided for the Gear VR™ platform, a viewer module may be provided for a web user, etc.

Viewer modules 11010 may allow users to log in, including setting up personalized settings based on user information held on backend server 11030, such as user preferences regarding height, Interpupillary distance (IPD), etc. A user may use a viewer module to access and experience a 3D experience or asset, and the 3D experience or asset may be chosen or adjusted based on the performance specifications of the platform the user is using, such as described above. Viewer modules 11010 may also build a 3D experience automatically based on settings and assets received from backend server 11030.

Figure 14:
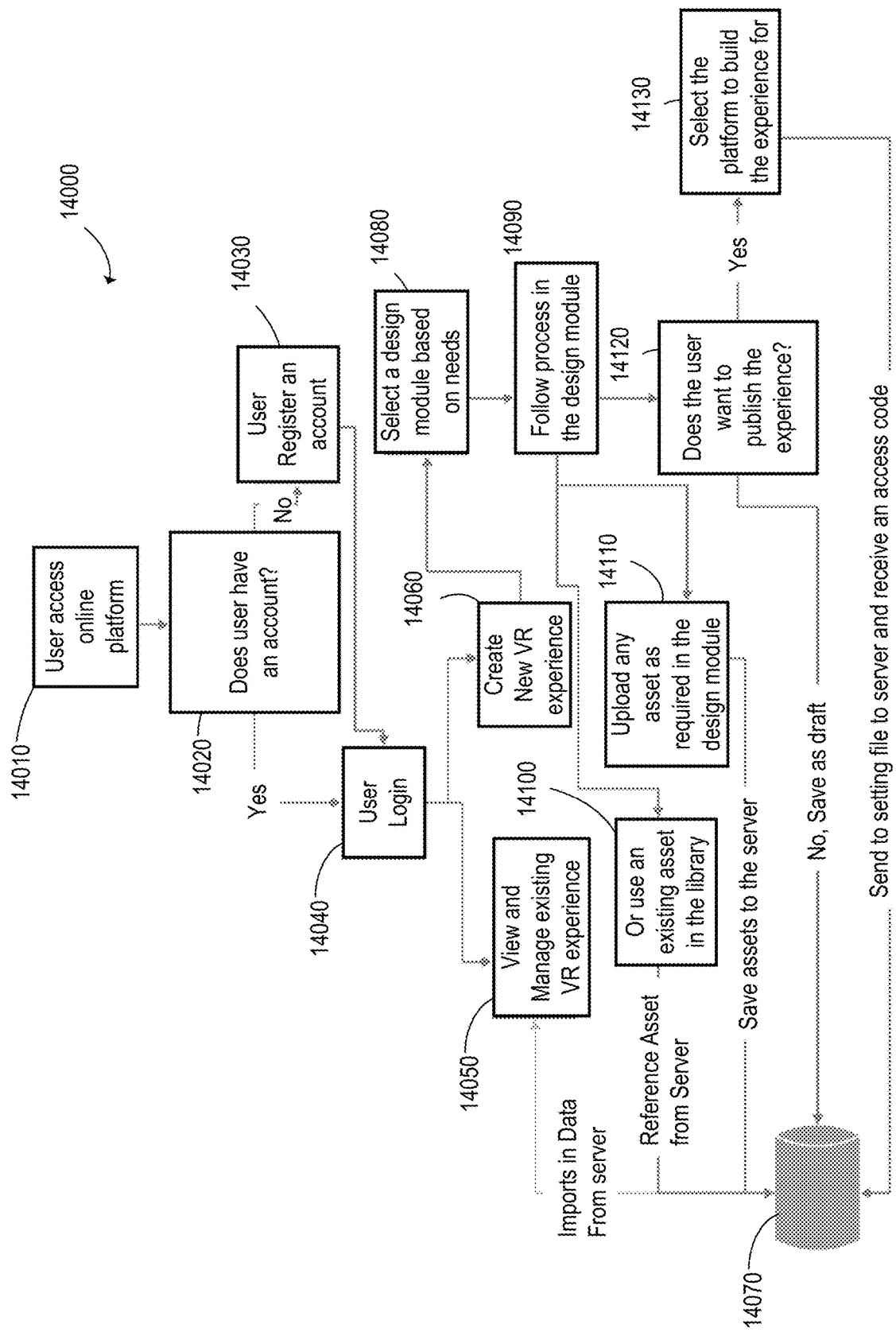
FIG. 14 is a flow chart of a method of creating VR content, in accordance with an embodiment.

FIG. 14 depicts a flow chart showing steps in creating a 3D experience or asset according to a method 14000. A user may access the online platform 14010, such as by interacting with login screen 12000 depicted in FIG. 12. The user may be prompted 14020 to reveal whether they have an account, and if they do not, to set up an account 14030.

Once the user is logged in 14040, the user may be provided with several options, including viewing and managing existing VR experiences or assists 14050, which may include editing or optimizing assets or experiences, or creating or optimizing new VR experiences or assets 14060. If a user chooses to view and manage existing VR experiences 14050, the required assets, experiences, and/or experience parameters may be loaded from a backend server 14070. If the user chooses to create or optimize a new experience or asset 14060, the user may be prompted to select a design module 14080. The user may than follow the process set up in the design module 14090 to create or optimize an experience or asset, which may include using an existing 3D asset 14100, optimized or unoptimized, such as an asset available from the backend server 14070, or an asset available from another source, such as a cache stored on a user device.

The user may also be provided with an opportunity to upload any asset for the design module 14110. The user may also have the option 14120, at any time, of saving the 3D experience as a draft on the backend server 14070 to be viewed and managed at a later time, or publishing the created 3D experience. If a user chooses to publish the 3D experience they may be prompted to select the platform to build the experience for 14130, and the published experience may be saved to the backend server 14070 and associated with an access code, to be accessed by any user using the access code. It is to be understood that the backend server 14070 may, in some embodiments, be located as part of the user device, such as when the system uses a cache or other local storage, or may be distributed across multiple physical locations.

Figure 15:
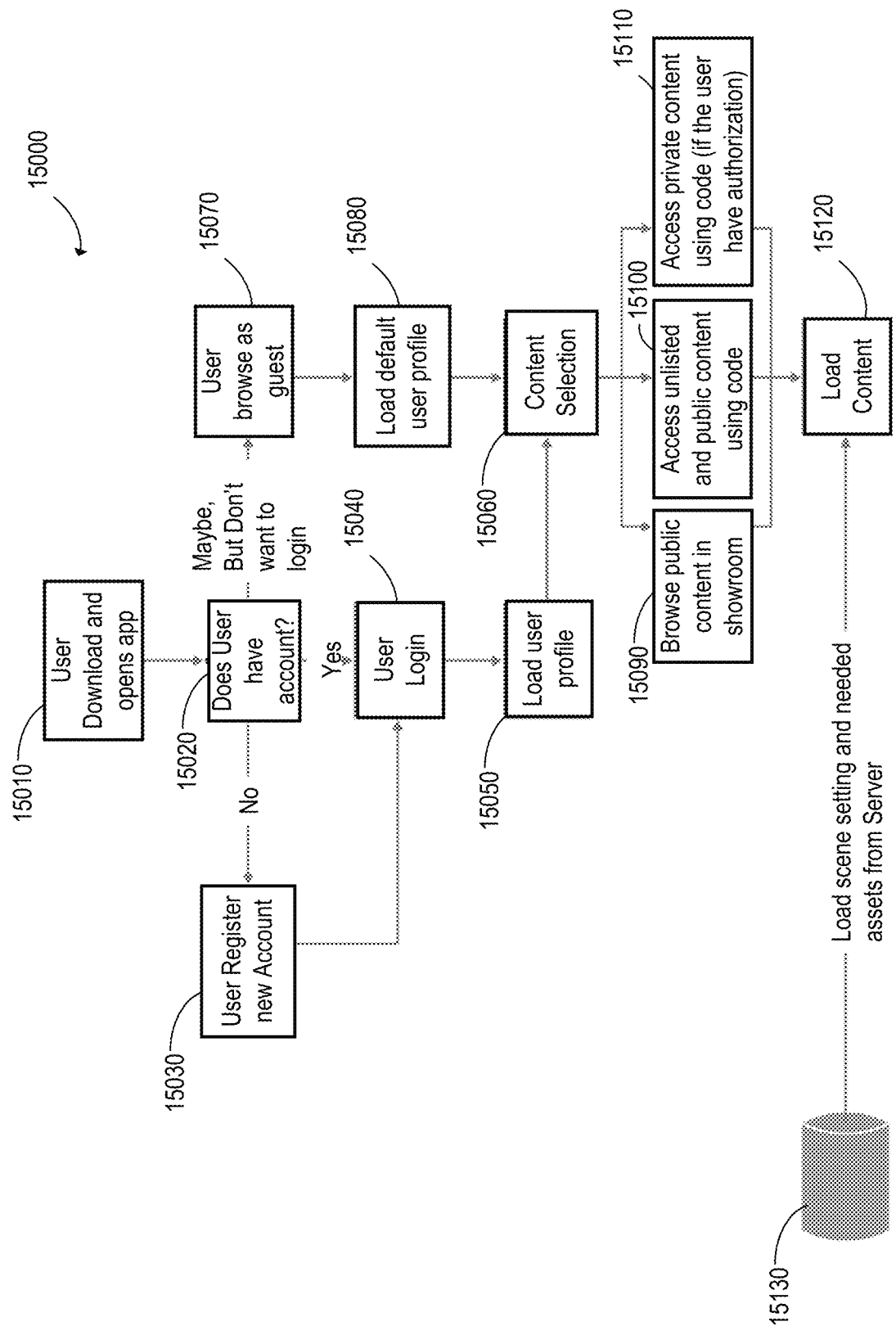
FIG. 15 is a flow chart of a method of selecting and uploading a VR experience, in accordance with an embodiment.

FIG. 15 depicts a flow chart showing steps to select and upload a 3D VR experience or asset according to a method 15000. The user may download and open a mobile application or other interactive interface 15010. The user may then be asked if they have an account 15020, and may be prompted to create an account 15030 if they do not have an account. The user may than be prompted to log in 15040, and their user profile may be loaded 15050. The user may then be presented with an option to choose content the user wishes to interact with 15060. The user may also have the option of browsing as a quest without logging in 15070, in which case a default user profile will be loaded 15080 to permit a user to choose content they wish to interact with 15060. When the user is given the option of choosing content they wish to interact with 15060, the user may be presented with the options of browsing public content in a showroom 15090, accessing both unlisted and public content using a code 15100, or accessing private content using a code and/or authorization details 15110. When the user has selected content to interact with 15120 the content may be loaded, such as in the form of assets and parameters for a 3D experience, from a backend server 15130.

Public content is content for which an access code is not required, such as content for which the access code is set to a generic access code, content for which the access code has been removed, content that was created without an access code, etc. It is to be understood that wherever a method or embodiment includes adding an access code, the user may choose to make the content public rather than setting a private access code.

Figure 16:
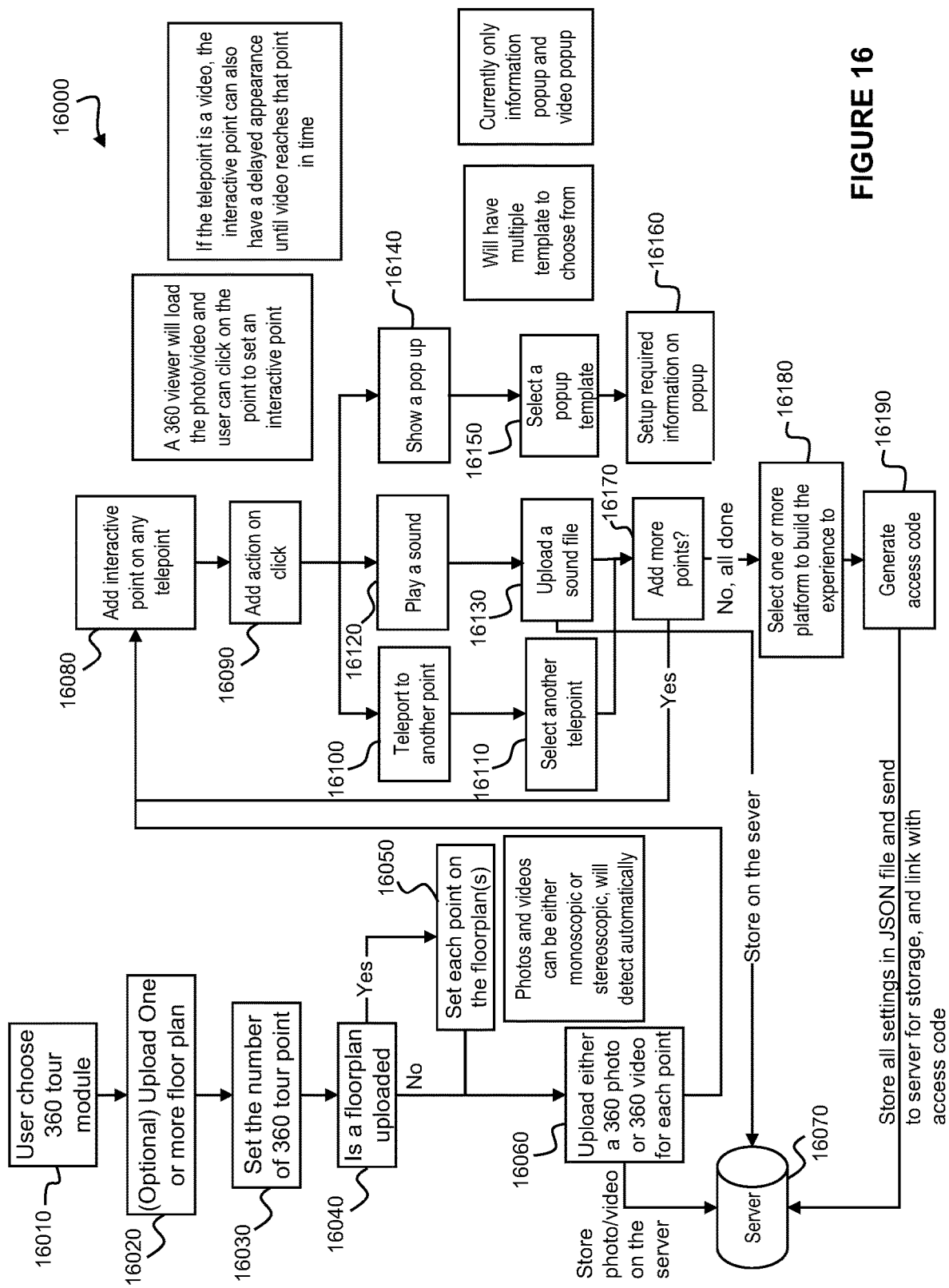
FIG. 16 is a flow chart of a method for creating a 3D virtual reality environment, in accordance with an embodiment.

FIG. 16 depicts a flow chart showing steps in a user creation of a 3D VR experience according to an embodiment 16000 involving a 3D tour of the 3D VR environment, using limited position points in a VR environment from which a user may view the environment. For example, when a user chooses to create a 3D experience, such as by following the disclosure above, the user may choose to use a 360 degree tour module 16010. The user may then have the option of uploading a floor plan 16020, and may be prompted to choose the number of tour points from which a user of the 3D tour may view the 3D VR environment 16030. The system may determine if a floor plan was uploaded by the user 16040, and if a floor plan was uploaded, may permit the user to set each point in the floor plan from which the 3D VR environment may be viewed 16050.

Regardless of whether a floor plan was uploaded, the user may upload one or more 360 degree photos or one or more 360 degree videos 16060, including monoscopic or stereoscopic files. The user may store one or more 360 degree photo or video on the server 16070, and may use one or more of the one or more photos or videos to create an interactive point from which the 3D VR environment may be viewed 16080. The user may then be permitted to add interactive actions 16090 which a viewer may take from the interactive point. For example, the user may add the option of teleporting to another point in the 3D VR environment 16100, which may involve choosing a new interactive point to teleport to 16110.

The user may also give a viewer the option of playing a sound 16120, and may upload a sound file 16130 to play if a viewer chooses to play a sound. The user may also give a viewer the option of viewing further popup information 16140, and the user may select a pop up template 16150 to use to set up the popup information to be displayed, and may add in further required information 16160.

The user may also be provided with the option of adding a second or third, interactive point to the 3D VR environment 16170 using one or more photos or videos, and may then be provided the option of adding interactivity to the new point. The user may also move freely within the flow chart to backtrack and edit interactive points and actions or interactivity at any time, to save a draft of their creation at any time or to upload additional photos or video at any time. When a user has finished adding interactive points and interactive actions, the user may select one or more platforms to build the experience to 16180 and may generate an access code 16190, and the tour may be stored on a backend server 16070. Settings may be stored in JSON files, and all required files may be linked to the access code.

Figure 17A:
FIG. 17A is a display image of a 3D virtual reality environment viewed in a VR mode.
Figure 17B:
FIG. 17B is a display image of the 3D virtual reality environment of FIG. 17A viewed in a non-VR mode.

FIGS. 17A and 17B depict a 3D VR environment viewed from an interactive point. The 3D VR environment may be viewed in either a VR mode 17010 (see FIG. 17A), or in a non-VR mode 17020 (see FIG. 17B). In the non-VR mode 17020, the 3D VR environment may be displayed as a regular photo, including a 360 degree photo. In the VR mode, such as in a mobile VR model 17010 in which an image is provided to each eye for use in applications, for e.g. Google Cardboard, the 3D VR environment may be depicted in 3D mode, including in a 3D 360 degree image or video mode.

One of the main contributors to the aesthetics and detail of a 3D model is a polygon count. In general, the higher the polygon count of the 3D model, the greater the complexity of the 3D model. However, as the complexity of the 3D model increases so does the time it takes the 3D model to be rendered onto a screen. This may not be a problem for static applications. For example, a real estate visualization may take as long as a couple hours to several days to render. But, this is feasible as long as the final rendered model achieves the desired look. In contrast, for real time applications such as gaming, virtual reality (VR), augmented reality (AR) and mixed reality (MR), a rendering speed of up to 120 times per second may be required. Accordingly, a 3D artist is often forced to make a compromise between complexity and performance.

Instead of making this compromise or working under a restrictive polygon budget, many 3D artists first create a high-poly version of the 3D model (i.e. a 3D model with a high polygon count). The 3D artist uses the high-poly version of the 3D model as a base mesh to create a low-poly version of the 3D model through retopology. Retopology uses mesh reduction techniques, such as mesh decimation, to reduce the polygon count of the high-poly model. After mesh reduction, texture mapping may be employed to add details from the high-poly model back into the low-poly model without a significant increase to the polygon count. Preferably, the end result is that the low-poly model looks indistinguishable from its high-poly model counterpart. In this way, the retopology process may be viewed as an optimization process since the objective is to make the low-poly model look as close to the high-poly model counterpart while reducing the polygon count to a specific target.

Reference is now made to FIGS. 18-26 which illustrate a system and method for making an optimized 3D model, in accordance with an embodiment.

Figure 18:
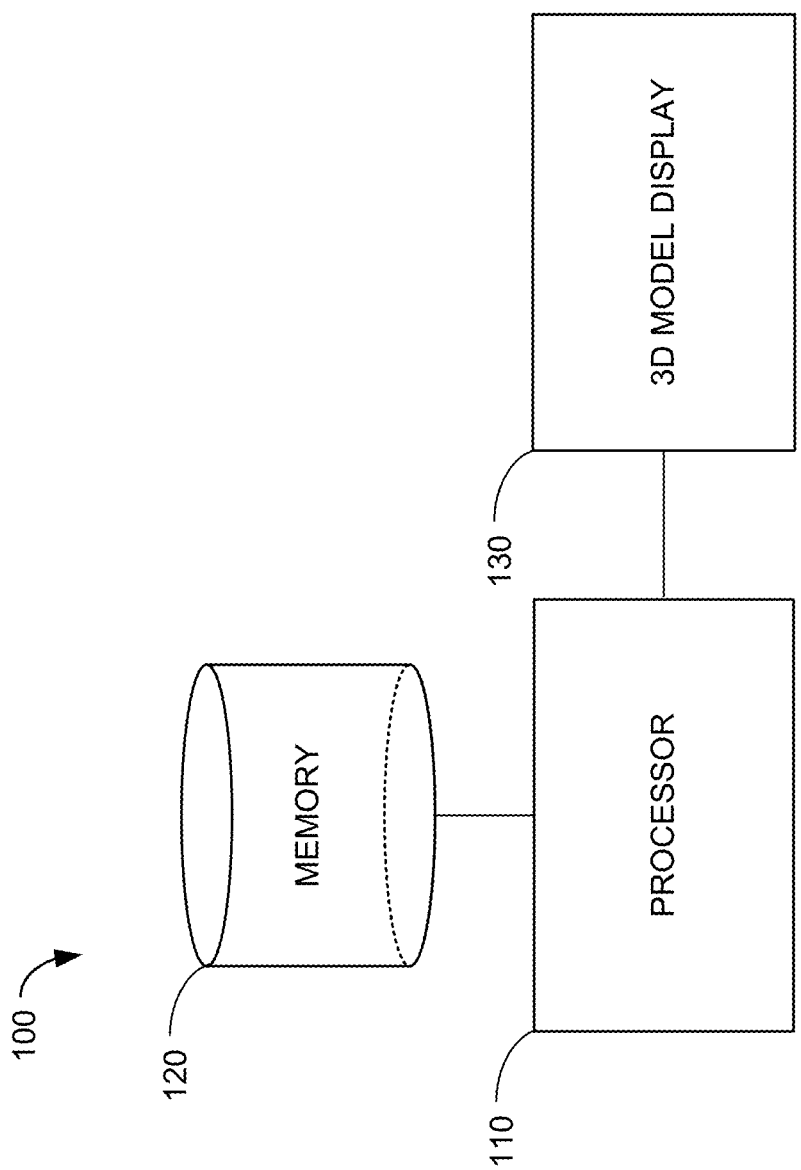
FIG. 18 is a block diagram of a system for making an optimized 3D model showing components of the system interacting with a processor.

FIG. 18 shows a block diagram 100 of a system for making an optimized 3D model. The block diagram 100 shows components of the system interacting with a processor 110. The processor 110 can interact with a memory 120 directly or via a network. The memory can store the high-poly 3D model and the optimized 3D model. The processor can also interact with a 3D model display 130 to display the high-poly 3D model and the optimized 3D model. The processor 110 can be configured to perform the methods described herein.

Figure 19:
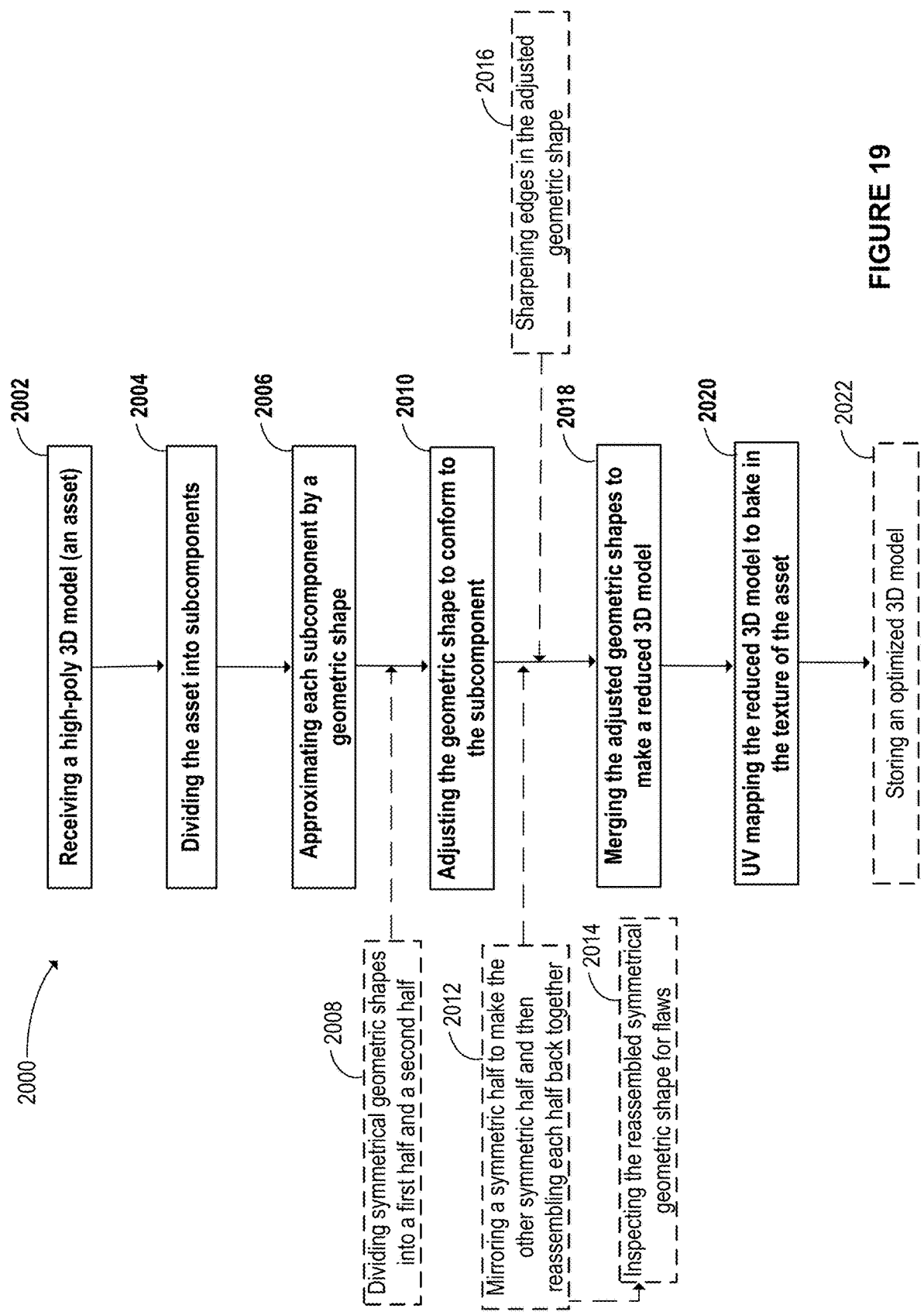
FIG. 19 is a flow chart of a method of making an optimized 3D model, in accordance with an embodiment.

FIG. 19 shows a flow chart of a method 2000 for making an optimized 3D model. The method 2000 can be performed by the processor 110 described above. The optimized 3D model (i.e. the low-poly model) may have a significantly reduced file size relative to the original 3D model (i.e. the high-poly model) due to a lower polygon count. As a result, the optimized 3D model may be streamed online with a lower bandwidth requirement and rendered onto the screen at an acceptable speed for real time applications. The method 2000 may make an optimized 3D model of higher quality relative to a low-poly 3D model made via other retopology techniques. In contrast to starting with the base mesh of the high-poly model, the method 2000 starts from a base shape and a targeted polygon budget.

The steps described below may be performed on a 3D modelling application.

Figure 20:
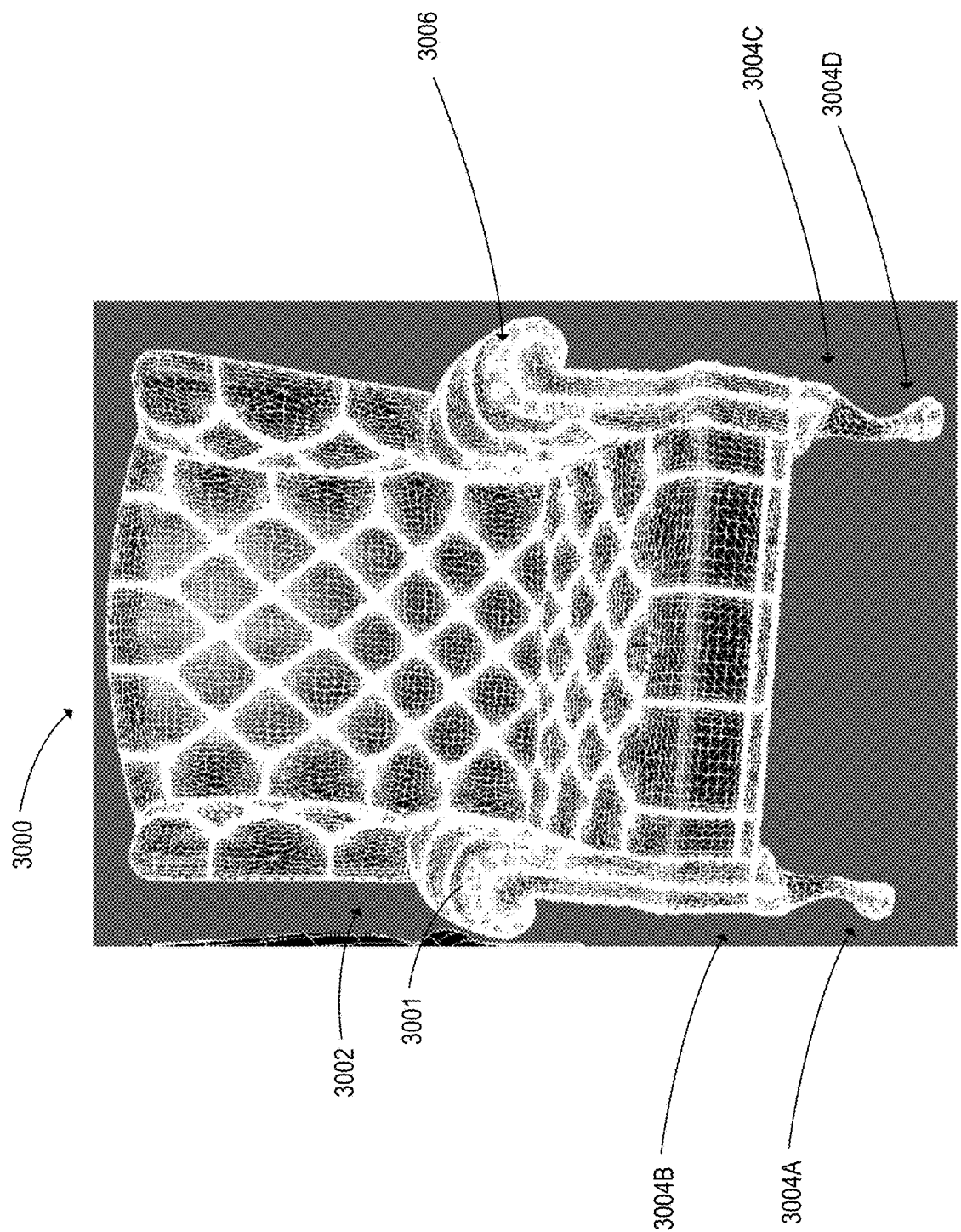
FIG. 20 is a screenshot of a high-poly 3D model of a leather arm chair.

At 2002, a high-poly 3D model is received for optimization. The high-poly 3D model may also be referred to as an "asset". The asset may be received in many different types of object files. For example, the object file may be an fbx file, or one of many computer-aided design (CAD) file formats. In some embodiments, the asset is downloaded from a web browser. For example, as shown in FIG. 20, the asset may be a leather arm chair 3000. In the illustrated example, the leather arm chair 3000 is shown with a mesh data 3001. The mesh data 3001 of the leather arm chair 3000 is highly detailed with a polygon count over 300,000. For most applications, the leather arm chair 3000 cannot be used at its current polygon count.

At 2004, the asset may be automatically divided by machine learning into a plurality of subcomponents. Alternatively, the asset may be divided manually by the 3D artist (for e.g., using a virtual brush). At 2006, each subcomponent of the plurality of subcomponents may be approximated by a geometric shape by machine learning.

Alternatively, each subcomponent may be approximated by a geometric shape manually selected by the 3D artist. That is, the 3D artist may select the preferred geometric shape to approximate each subcomponent. For example, the 3D artist may use the virtual brush to "paint" an area of the asset that needs to be retopologized into a single geometric shape. The 3D artist can then define constraints, such as, for example, a targeted polygon count for that shape. In some embodiments, as the 3D artist uses the virtual paint brush to divide the asset, machine learning detects boundaries and surfaces of the asset and suggest subcomponents appropriate for division and/or suitable shapes to approximate the suggested subcomponents.

In contrast to retopologizing the high-poly 3D model as a whole, each subcomponent may be retopologized individually, thus simplifying the overall retopology process. Further, by retopologizing each subcomponent individually, the retopology process for each subcomponent does not need to be completed for the optimized 3D model to be useful. For example, a 3D artist may use the subcomponents which have been retopologized to speed up their workflow prior to the retopology process being completed for all subcomponents (i.e. the 3D artist can work on a partially completed optimized 3D model).

Figure 21A:
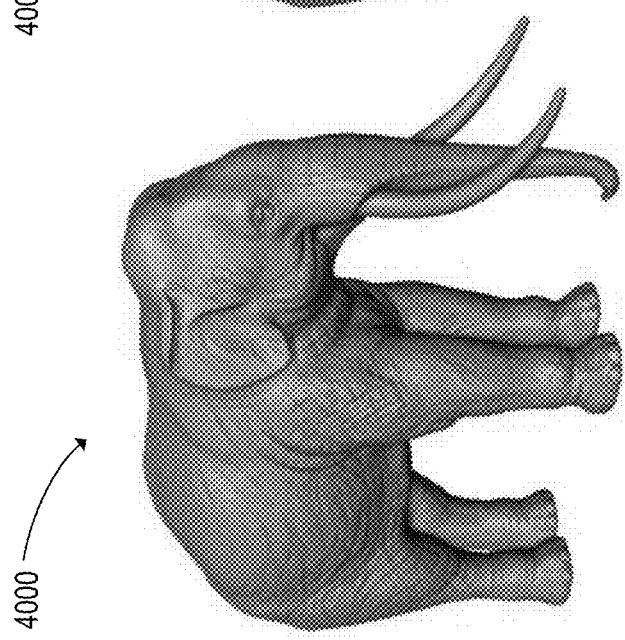
FIG. 21A is a screenshot of a high-poly 3D model of an elephant.
Figure 21B:
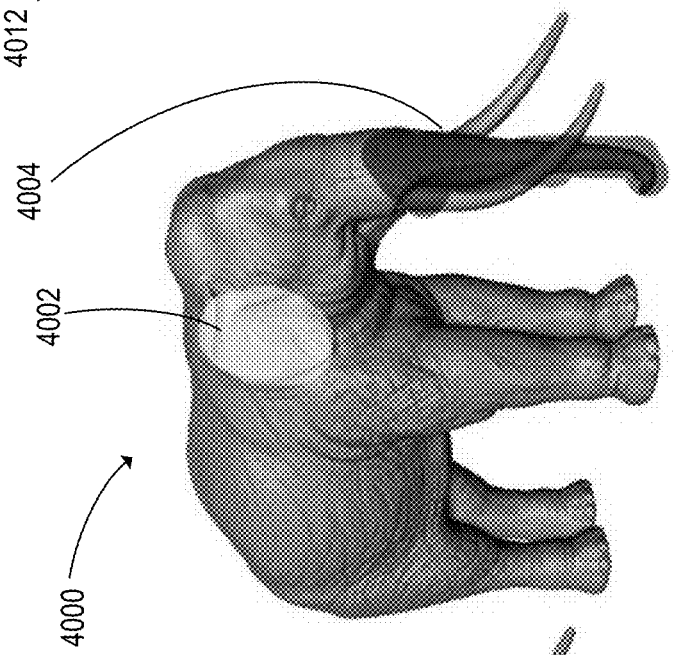
FIG. 21B is a screenshot of the elephant of FIG. 20A showing an ear subcomponent and a trunk subcomponent.
Figure 21C:
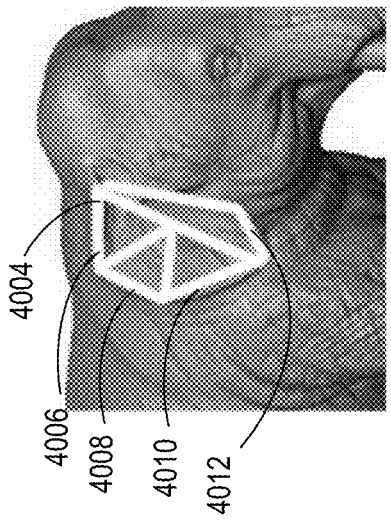
FIG. 21C is a screenshot of the ear subcomponent of FIG. 20B showing a diamond approximation.
Figure 21D:
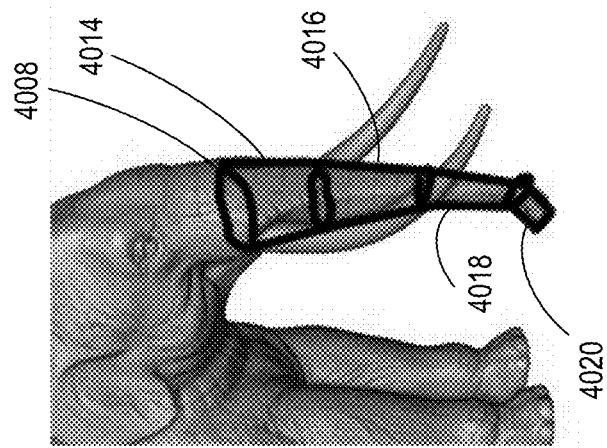
FIG. 21D is a screenshot of the trunk subcomponent of FIG. 20B showing a cylindrical approximation.

For example, FIG. 21A shows a high-poly model of an elephant 4000. FIG. 21B shows the high-poly model of an elephant 4000 after it has been divided into subcomponents augmented by machine learning. As shown, an ear 4002 and a trunk 4004 are subcomponents of the high-poly model of an elephant 4000. FIG. 21C shows the ear 4002 approximated using triangles 4006, 4008, 4010 and 4012. FIG. 21D shows the trunk 4004 approximated using cylinders 4014, 4016, 4018, 4020. Machine learning may make these approximations automatically. Alternatively, the 3D artist can make them manually with or without help from machine learning.

A different geometric shape may be used to provide the preferred approximation for each subcomponent of the plurality subcomponents. As geometric shapes are built around the original geometry, each subcomponent may exhibit directed edge flow. The original geometry of each subcomponent and its topological flaws may be ignored.

Each subcomponent of the plurality of subcomponents is part of the overall asset (i.e. the high-poly 3D model). Machine learning may determine or suggest a basic geometric shape that closely approximates the shape of the subcomponent. Machine learning may determine the general building blocks of the asset by determining the basic geometric shape of each subcomponent.

Machine learning may be able to suggest that the ear 4002 may be approximated by the diamond 4006 and that the trunk 4004 may be approximated by the cylinders 4008, 4010, and 4012. Machine learning may make these determinations or suggestions based on data acquired from existing models and/or data acquired from the manual selections made by the 3D artist in previous optimization processes. Machine learning may work by developing a rich and continually expanding data set acquired from previous optimization processes and existing models.

Figure 22:
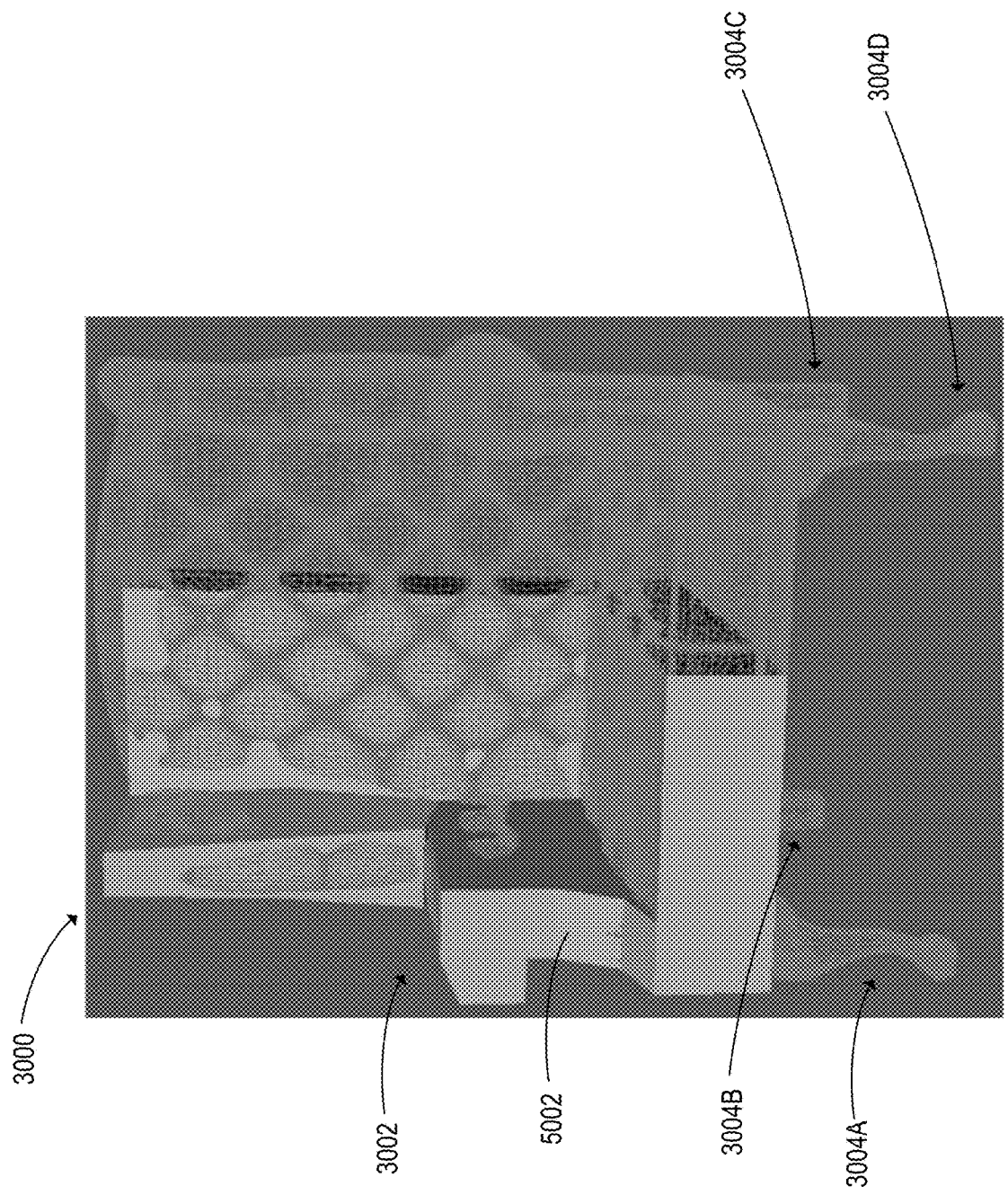
FIG. 22 is a screenshot of the leather arm chair of FIG. 19 showing a left half of an extruded cube approximating the shape of a chair subcomponent.

For example, as shown in FIG. 22, the leather arm chair 3000 is divided into a chair subcomponent 3002 and leg subcomponents 3004A, 3004B, 3004C and 3004D. The chair subcomponent 3002 is approximated as an extruded cube 4002 to match the general geometric shape of the chair subcomponent 3002. Optionally, at 2008, one or more of the symmetrical geometric shapes used to approximate the subcomponents may be divided into symmetric halves (i.e. a first half and a second half). The symmetry of the geometric shapes may be pre-determined. For example, as shown in FIG. 22, a left half of the extruded cube 5002 remains while a right half (not shown) is removed. Once the left half of the extruded cube 5002 is retopologized, it is mirrored to fit the right half. This may present time significant savings.

At 2010, the geometric shape approximating each subcomponent is adjusted to substantially conform to the shape of that subcomponent by adding detail. For example, detail may be added by superimposing the geometric shape with the corresponding subcomponent and using suitable drawing tools to smooth the geometry and add edges to the geometric shape such that it substantially conforms the to the shape of the subcomponent. Superimposing in this context may also be referred to as "making the subcomponent live". In some embodiments, the 3D artist manually uses the drawing tools adjust the geometric shape approximating each subcomponent based on their needs. For example, the drawing tools may be the drawing tools or optimization tools of a suitable 3D modelling application.

As discussed above, the 3D artist may be constrained at 2010 by the targeted polygon count. The targeted polygon count may be set prior to beginning the optimization process. For example, the target polygon count is based on an acceptable level of detail for the optimized 3D model's intended use. In addition, the target polygon count may be determined based on the processing capabilities of the application that will be used to render the optimized 3D model. In some embodiments, where additional details are needed, the 3D artist divides polygons (for e.g., one quad subdivided into two quads). The 3D artist may do this until the targeted polygon count is met.

In embodiments where symmetrical geometric shapes have been divided into symmetric halves (at 2006), mirroring one of the first half or second half is used to make the other of the first half or the second half. After mirroring, the first half and the second half is reassembled to form a reassembled symmetric geometric shape. In some embodiments, at 2014, the reassembled adjusted geometric shape is inspected to make sure the geometric shape is manifold and watertight.

A 3D geometric shape is manifold when its face and edges do not overlap (i.e. share the same space) with the face or edges of other 3D geometric shape. The existence of non-manifold geometry may lead to 3D models that are not watertight since adjoining polygons may not be properly attached to one another. In some embodiments, the mirroring is applied by a mirror surface operator of the suitable 3D modeling application.

Figure 23:
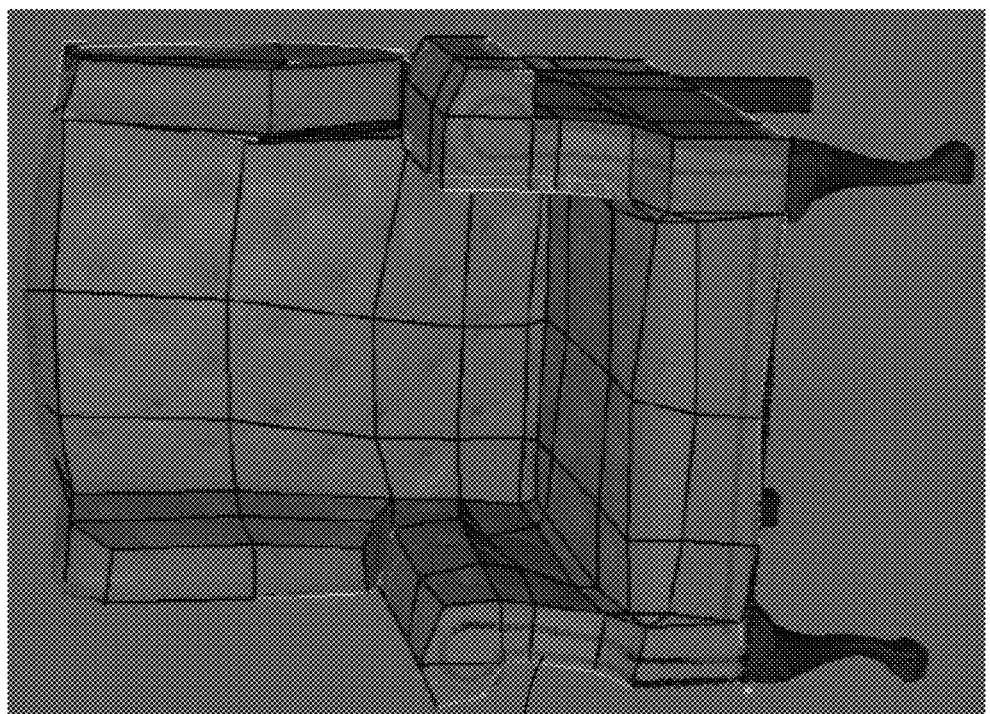
FIG. 23 is a screenshot of an adjusted extruded cube substantially conforming to the shape of the chair subcomponent of FIG. 21.

For example, as shown in FIG. 23, an adjusted extruded cube 5002' now substantially conforms to the shape of the chair subcomponent 3002 of the leather arm chair 3000. In the illustrated example, a geometry offset of 1 is added to retain the shape of the chair subcomponent 3002 as best as possible. The adjusted extruded cube 5002' is now appropriately be referred to as a reduced chair subcomponent 5002' since its shape now substantially conforms to the shape of the chair subcomponent 3002 while having a reduced polygon count. Optionally, at 2016 a crease tool may be used to sharpen the edges between adjoining polygons in one or more of the reduced subcomponents. A "crease" or "seam" is a modelling term commonly used to describe the edges between adjoining polygons. For example, if polygons are divided, for e.g., at 2010, to provide more detail, the 3D artist can use the crease tool to increase or decrease a vertex weight of a vertex point in a divided polygon. Increasing or decreasing the vertex weight of a specific vertex point may be based on how much that vertex point contributes to the overall geometry. For example, a vertex point on an edge (i.e. a seam between two polygons) may be set to a higher vertex weight to ensure this edge is sharp and well-defined. That is, the crease tool can allow the sharpening of the edges of the reduced subcomponents without having to increase the polygon count. In the illustrated example, where the asset is the leather arm chair 3000, the crease tool may be of significant benefit in making the reduced subcomponents more closely resemble the original subcomponents. For example, the crease tool is a crease tool of the suitable 3D modeling application.

Figure 24:
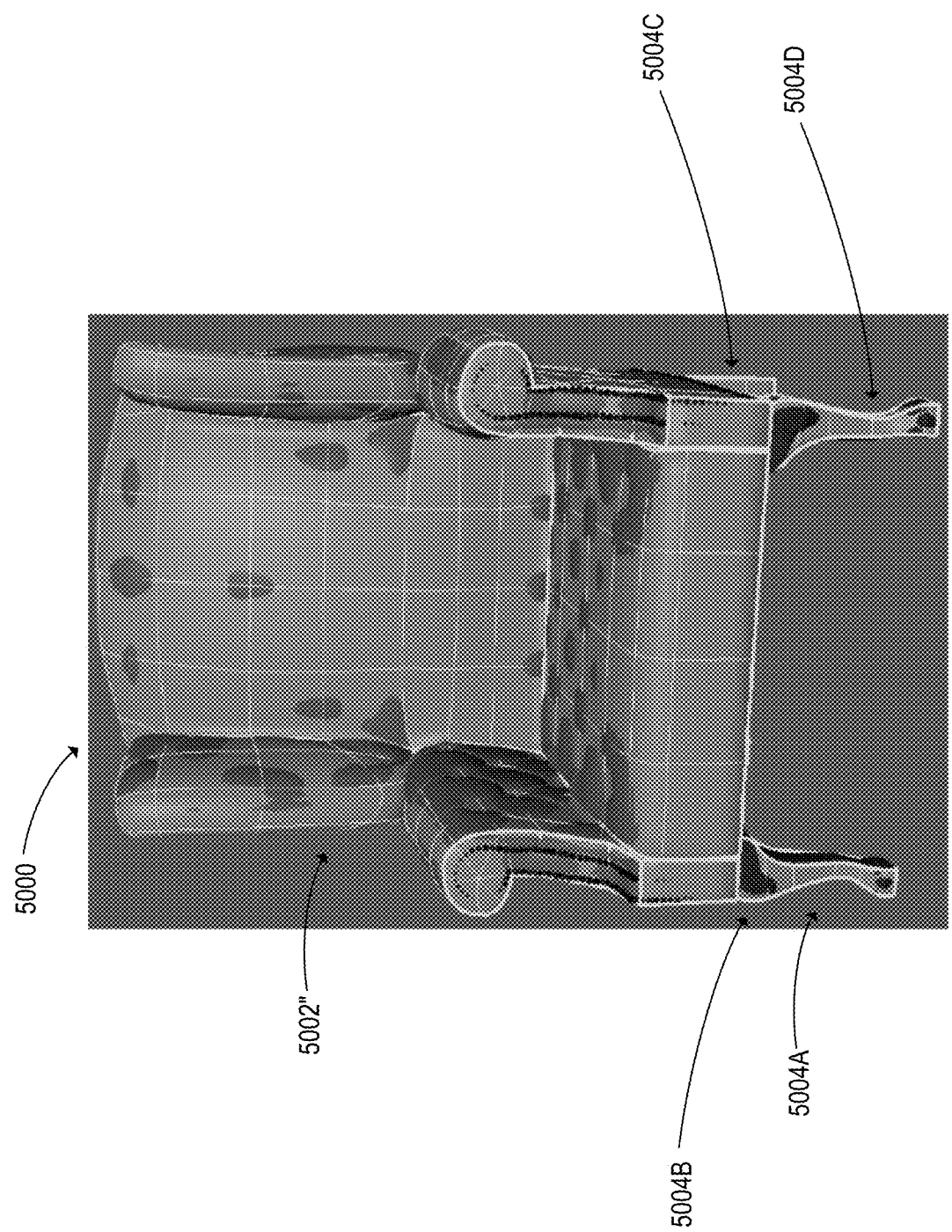
FIG. 24 is a screenshot of a reduced 3D model of the leather arm chair of FIG. 19.

At 2018, each reduced subcomponent may be merged to make a reduced 3D model. For example, FIG. 24 shows a reduced leather arm chair 5000 having a reduced chair subcomponent 5002" and reduced leg subcomponents 5004A, 5004V, 5004C and 5004D. In the illustrated example, the reduced chair subcomponent 5002" is an improved version of the reduced chair subcomponent 5002' of FIG. 22 after use of the crease tool at 2016.

At 2020, the reduced 3D model is UV mapped to bring back the texture of the asset. "Baking" is a term often used in 3D modelling to describe a process of bringing in or applying texture to a surface. UV mapping is a process of projecting a 2D image to a 3D model's surface for the purposes of texture mapping. For example, a suitable UV editing application performs the UV mapping by generating the appropriate UV maps (e.g. normal maps, height maps, bump maps, etc.) to bake in the texture of the asset back into to the reduced 3D model.

For example, at 2020, the reduced 3D model is UV unwrapped to allow textures of the high-poly 3D model to be baked into the surface. That is, the reduced 3D model, having X, Y, and Z components is converted into a 2D map having U and V components, defining a UV space. The UV space may be a 0-1 border space. In performing the UV unwrapping, it is preferable to use as much of the UV space as possible. Once the reduced 3D model is UV unwrapped, distortion in the 2D map caused by warping, skewing or scaling may be removed. Next, overlapping UVs may be removed or fixed. UVs extending beyond the UV space will not be mapped. As a result, the unwrapped UV is inspected to ensure no UVs extend beyond the UV space. For example, the UV space may be inspected to ensure no UVs are outside the 0-1 border space. If UVs are found to extend outside the 0-1 border space, the reduced 3D model may need to be UV unwrapped again. The UV unwrapping process described above may be automated by the processor 110 or performed manually by the 3D artist. In embodiments where the UV unwrapping process is automated, the sharpened edges created at 2016, for example, by the crease tool, are used to define the seams (i.e. edges between adjoining polygons) in the UV unwrapping process. This may allow the texture to look natural.

In some embodiments, machine learning is used to identify areas where more highly detailed textures are required. In the illustrated example, a front and a top of the leather arm chair 3000 (see FIG. 20) need more detail in comparison to a bottom of the leather arm chair 3000. This may be done, for example, by enlarging the size of the UV map for the top and front of the leather arm chair 3000 and shrinking the size of the UV map for the bottom of the leather arm chair 3000.

Figure 25:
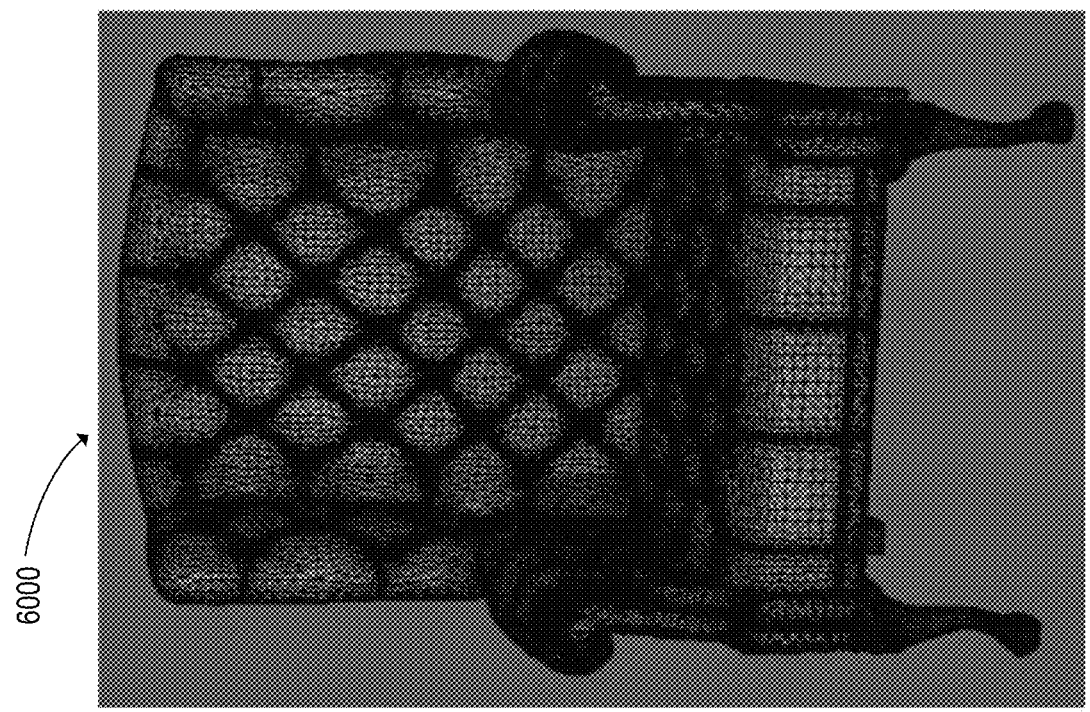
FIG. 25 is a screenshot of a texture map generated from UV mapping the reduced 3D model of FIG. 23.

UV mapping at 2020 may be viewed as a form of "post processing" or further refinement. For example, FIG. 25 shows a texture map 6000 generated by the UV mapping of the reduced 3D model 5000. At the conclusion of 2020, the reduced 3D model may be considered an optimized 3D model since this model contains the optimal amount of detail and texture based on the target polygon budget.

Figure 26:
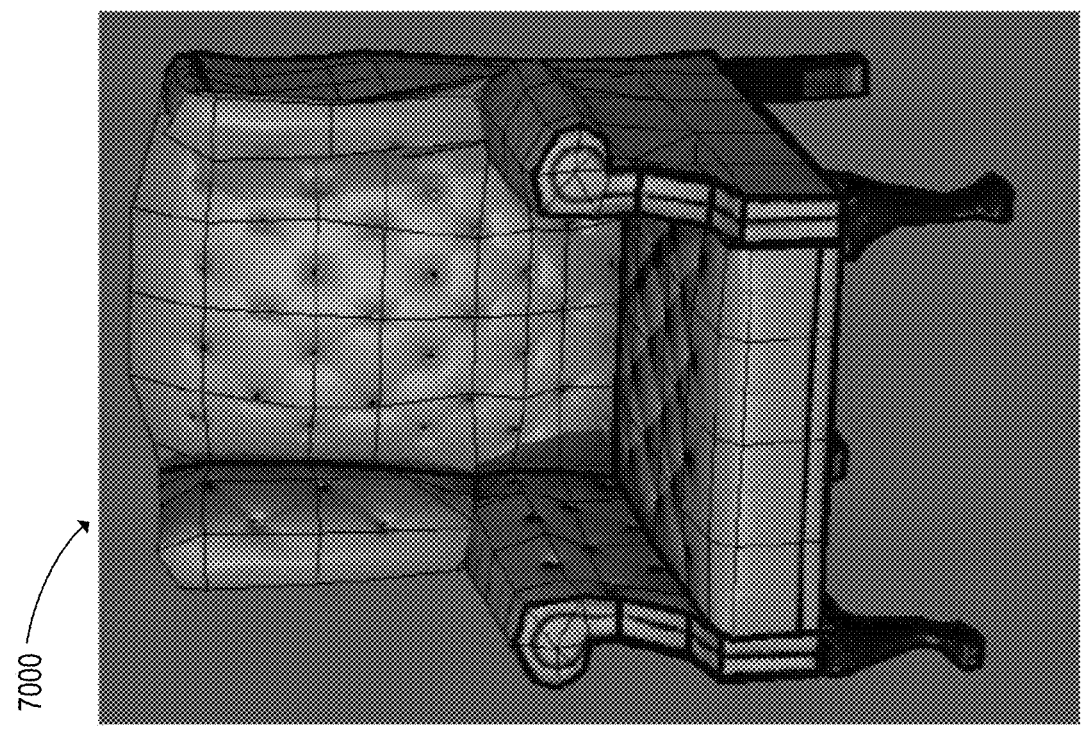
FIG. 26 is an optimized 3D model of the leather arm chair of FIG. 19.

For example, FIG. 26 shows an optimized leather arm chair 7000. The optimized leather arm chair 7000 has 500 polygons. The leather arm chair 3000 (i.e. the asset) has over 300,000 polygons. This works out to a 99.83% reduction in polygons. The optimized leather arm chair 7000 may contain an acceptable level of detail for a wide range of applications.

At 2022, the optimized 3D model may be stored in one or more databases for future use. For example, the optimized 3D model may be stored on a web server. In some embodiments, the optimized 3D model is stored into specialized model libraries which are ready for in a specific application.

The optimized 3D model may be easily adjusted to create level of details (LODs). This has the advantage of permitting the quality of the optimized 3D model to be easily adjusted in real time for multi-platform applications. For example, LODs may be set based on the polygon budget across the multiple platforms.

Since the optimized 3D model does not contain any of the topological flaws of the asset (i.e. the high-poly model), it has a clean topology. That is, the optimized 3D model exhibits clean edge flow. For this reason, the optimized 3D model may be used in real-time applications, such as, for example animations, video games, virtual reality (VR), mixed reality (MR) and augmented reality (AR). This is in contrast to other methods of retopologizing a 3D model which, due to their inability to preserve edge flow, may not be used in real time applications. For example, the optimized 3D model made via method 2000 may be used in VR, AR and MR applications to enable highly detailed models to be used on devices with modest processing capabilities. Furthermore, the optimized 3D model may be used in the gaming industry to save cost and time in on 3D model creation. The optimized 3D model may also be used in the film and animation industry to save cost and time on rendering. The optimized 3D model may also be used by engineering and architecture firms to bring higher quality models to their clients.

Figure 27:
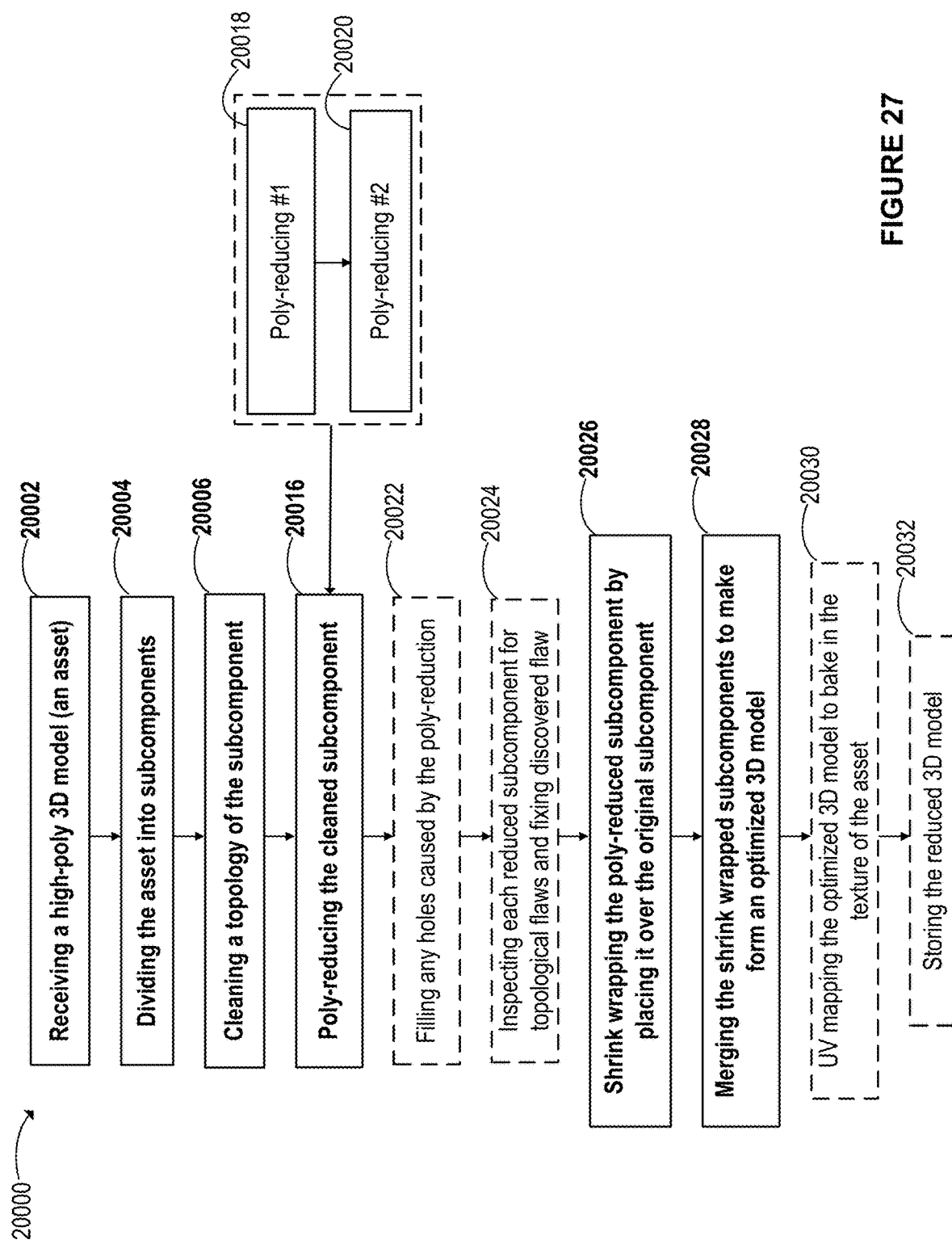
FIG. 27 is a flow chart of a method of making an reduced 3D model, in accordance with an embodiment.

Reference is now made to FIGS. 27-32 to illustrate a method of making an optimized 3D model, in accordance with an alternative embodiment. FIG. 27 shows a flow chart of a method 20000 for making the reduced 3D model. The method 20000 can be performed by the processor 110 described above.

At 20002, a high-poly 3D model may be received for reduction. The high-poly 3D model may also be referred to as an "asset". For example, the asset may be the leather arm chair 3000 of FIG. 20. The mesh data 3001 of the leather arm chair 3000 has a polygon count over 300,000. For most applications, the leather arm chair 3000 cannot be used at is current polygon count. Method 20000 relies on a base mesh (i.e. the mesh data 3001) of the asset.

On closer examination of the mesh data 3001 of leather arm chair 3000, it may be observed that there is little consideration edge flow, efficiency and texture creation. In the illustrated example, the leather arm chair 3000 includes N-gons, lamina faces, non-manifold geometry, holes, and edges with little to no area for UV mapping. Edge flow in this context refers to how edges are linked together in a 3D model based on its topology. In general, the cleaner the edge flow, the easier it is for the 3D artist to add animation and reduce problems during the reduction process. Non-manifold geometry may also lead to unmapped UVs (i.e. areas where UV mapping cannot be completed).

Tessellation is an arrangement of polygon shapes that are closely fit together in a repeated pattern without gaps or overlapping. When polygon shapes being arranged include N-gons, polygons that have more than four [4] sides, random tessellation problems possibilities may be presented. As a result, geometry editing may be impaired.

At 20004, the asset may be divided into a plurality of subcomponents. Each subcomponent may have a set of edges defining the shape of the subcomponent where adjoining edges meet at vertices. Dividing the asset into subcomponents may make identifying flaws in topology and invalid geometry easier.

For example, as shown in FIG. 20, the leather arm chair 3000 may be divided into a chair subcomponent 3002, a metal rivets subcomponent 3006 and leg subcomponents 3004A, 3004B, 3004C, 3004D. The chair subcomponent 3002 has non-manifold geometry and holes at the locations where the metal rivets were removed.

Figure 28:
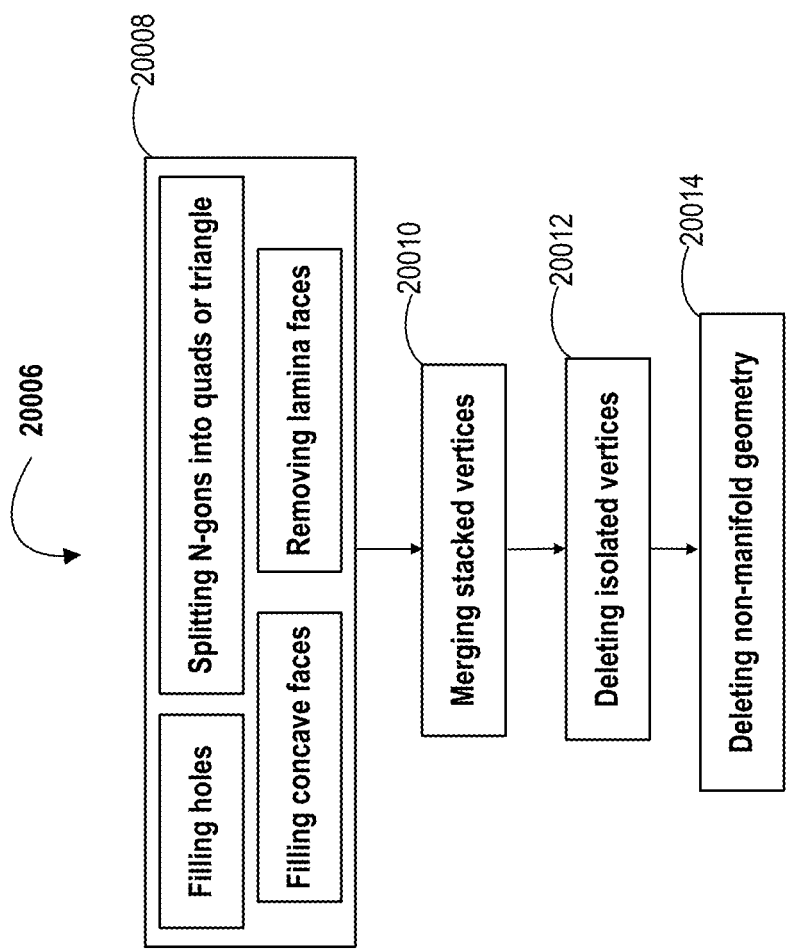
FIG. 28 is a flow chart showing steps of cleaning a topology of a subcomponent.

As illustrated in FIG. 28, at 20006, a topology of each subcomponent of the plurality of subcomponents may be cleaned to make the geometry watertight and manifold.

At 20008, to make the topology of each subcomponent watertight, tessellation problems may be fixed by one or more of i) filling holes, ii) filling concave faces, iii) splitting N-gons into quads or triangles, and iv) removing lamina faces. Lamina faces are faces that share all of their edges. Lamina faces may cause long processing time when exporting or storing the reduced 3D model.

After tessellation problems have been fixed, at 20010, the vertices of the subcomponent are merged to make the subcomponent watertight. For example, overlapping vertices (i.e. vertices that are stacked on top one another at an edge of the plurality of edges) are merged or welded together to make the subcomponent watertight. In some embodiments, vertices are placed along edges that are not at end points. These isolated vertices may be related to N-gons which are not needed to close the subcomponents face.

At 20012, all isolated vertices are deleted. After overlapping vertices have been merged and isolated vertices have been deleted, at 20014, any remaining non-manifold geometry is deleted. At this point, each subcomponent may be referred to as a cleaned subcomponent.

Figure 29:
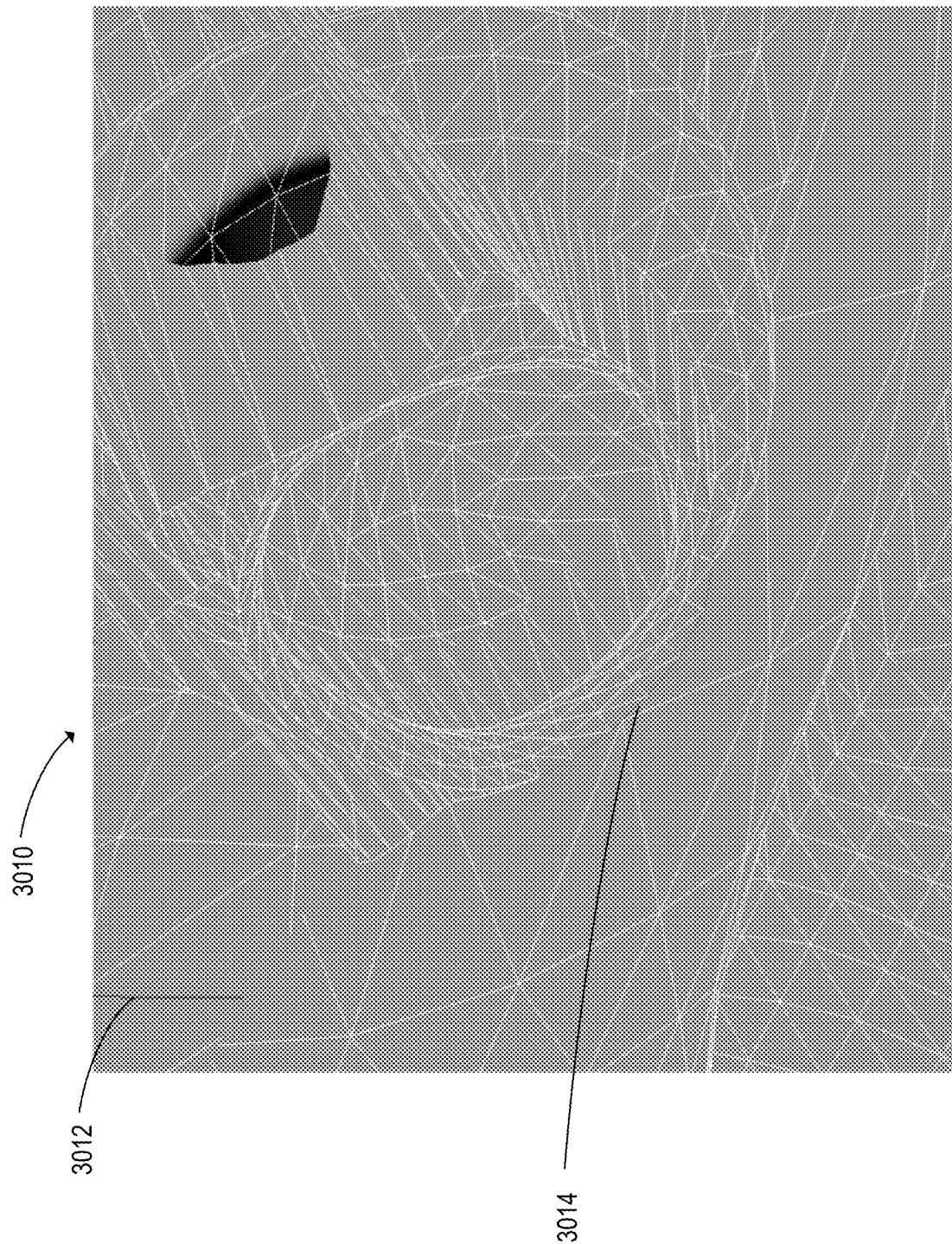
FIG. 29 is a screenshot of an enlarged view of a portion of a chair subcomponent.

FIG. 29 shows an enlarged view of a portion 3010 of the chair subcomponent 3002. The portion 3010 of the chair subcomponent 3002 includes an edge 3012 causing an isolated vertex. The edge 3012 may be deleted (at 20012). The portion of the chair subcomponent 3010 also includes a line element 3014 added to make the subcomponent watertight (at 20008).

At 20016, each cleaned subcomponent is poly-reduced (i.e. has its polygon count reduced). In some embodiments, each cleaned subcomponent is poly-reduced twice.

At 20018, each cleaned subcomponent undergoes a first poly-reduction. In the first poly-reduction, each cleaned subcomponent is poly-reduced by a reduction rate of 50%.

At 20020 each cleaned subcomponent undergoes a second poly-reduction, this time by a reduction rate of 95%. After undergoing poly-reduction at 20018 and at 20020, the cleaned subcomponent may, for example, experience a 93-98% reduction in polygons. The percentage polygon reduction may vary based on the asset and may only be determined after 20018 and 20020. At this point, each cleaned subcomponent may be referred to as a reduced subcomponent.

Figure 30:
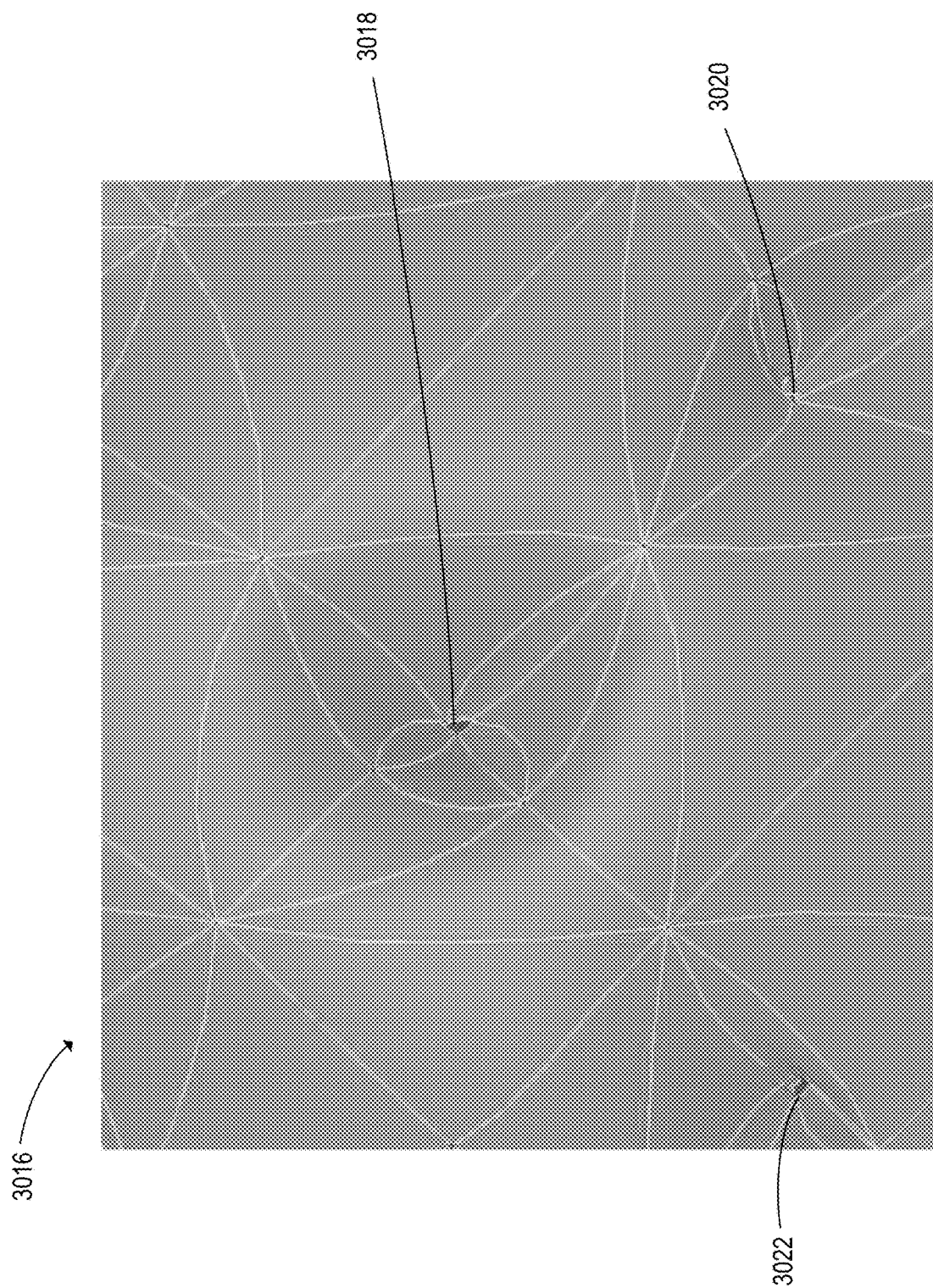
FIG. 30 is a screenshot of an enlarged view of another portion of the chair subcomponent.

At 20022, any holes in each of the reduced subcomponents caused by poly-reduction steps 20018 and 20020 may be filled. For example, FIG. 30 shows an enlarged view of a portion 3016 of the chair subcomponent 3002. As shown, the poly-reduction steps 20018 and 20020 have left holes 3018, 3020 and 3022 where the metal rivets were located. The holes 3018, 3020, and 3022 may be filled by merging vertices in the area of the metal rivets. If the poly-reduction steps 20018 and 20020 did not create any holes, no holes will be filled at 20022.

Optionally, at 20024, each reduced subcomponent is inspected to ensure it does not contain non-manifold geometry, isolated vertices or other topological flaws. If, at 20024, non-manifold geometry and isolated vertices are detected, they may be deleted. For example, the reduced chair subcomponent may be inspected to ensure it does not contain any non-manifold geometry or isolated vertices. If the reduced chair subcomponent were compared to the original chair subcomponent 3002 shown in FIG. 19, a significant reduction in polygons may be observed. However, the reduced chair component 3020 may also appear to have lost some of its original shape.

Figure 31:
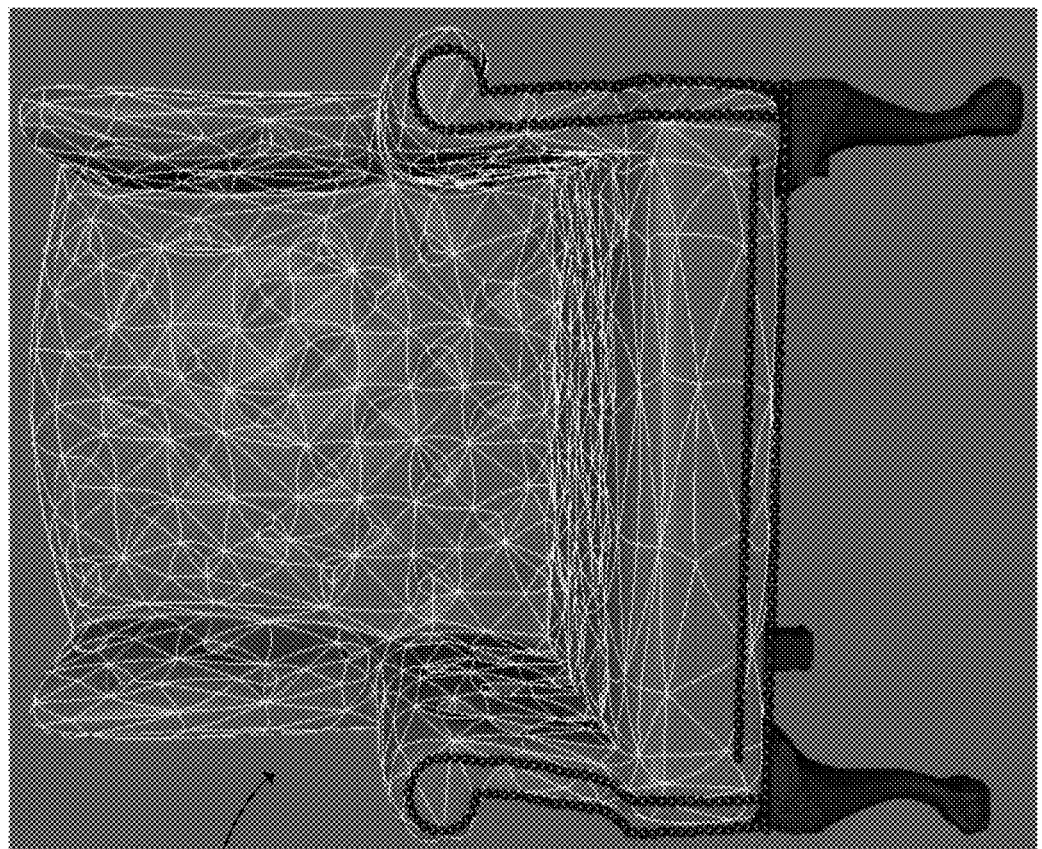
FIG. 31 is a screenshot of a reduced chair subcomponent being shrink wrapped over the original chair subcomponent.

At 20026, each reduced subcomponent is placed over the original subcomponent and a shrink wrap performed to bring back some of the details of the original subcomponent. For example, as shown in FIG. 31, the reduced chair subcomponent 3024 may be placed over the original chair subcomponent 3002 (i.e. the subcomponent prior to step 20006) and a shrink wrap performed to bring back some of the details of the original chair subcomponent 3002. This same process (not shown) may be repeated for the leg subcomponents 3004A, 3004B, 3004C, and 3004D.

Figure 32:
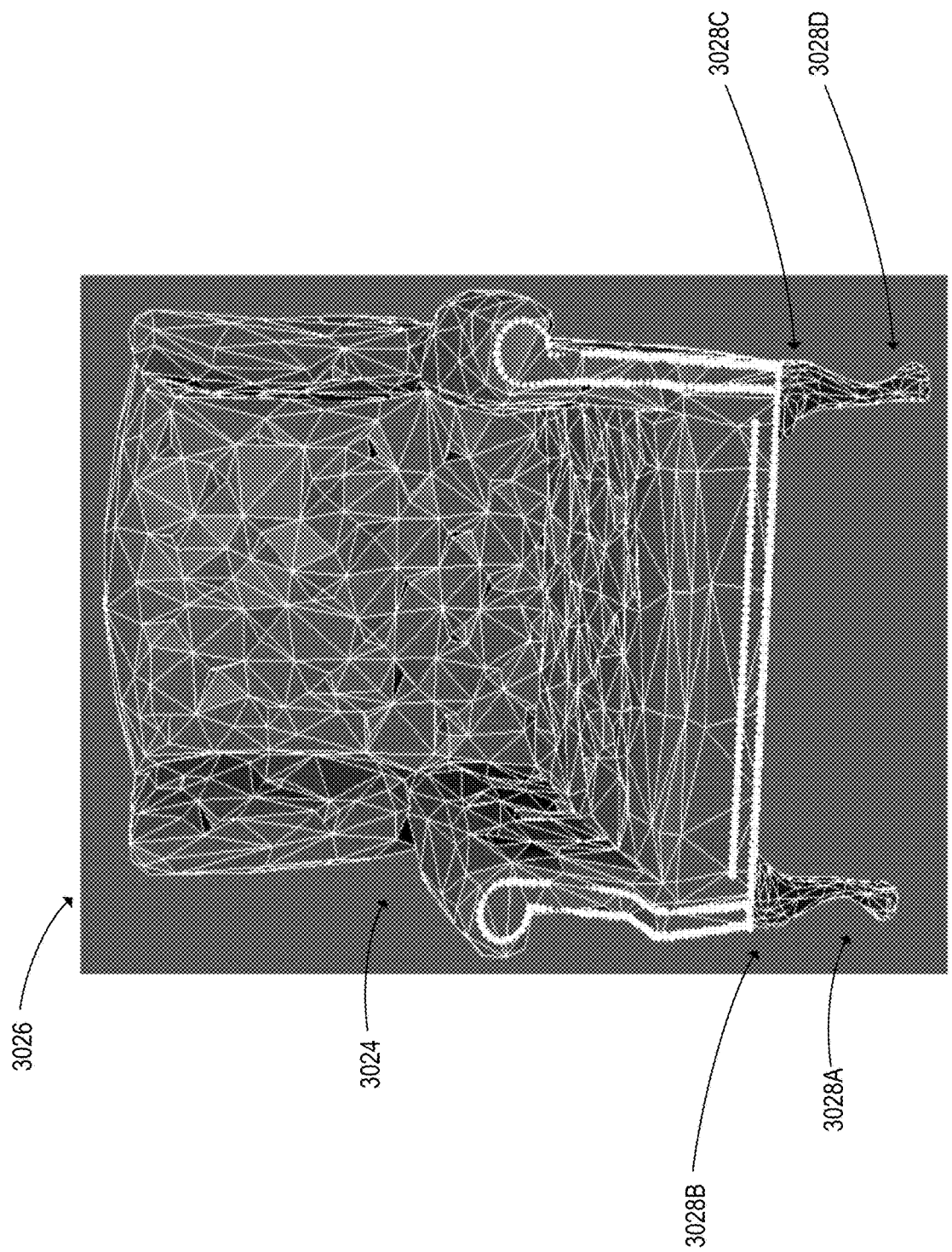
FIG. 32 is a screenshot of a reduced leather arm chair.

At 20028, each reduced subcomponent is merged to make a reduced 3D model. For example, FIG. 32 shows a reduced leather arm chair 3026 having a reduced chair subcomponent 3024 and reduced leg subcomponents 3024A, 3024B, 3024C and 3024D. In the illustrated example, the reduced leather arm chair 3022 has 60000 polygons. The metal rivet subcomponent 3006 that runs around the reduced leather arm chair 3022 may be removed. After the metal rivet subcomponent 3006 is removed, the reduced leather arm chair 3022 has 1500 polygons. The leather arm chair 3000 (i.e. the asset) has over 300,000 polygons, a 99.5% reduction in polygons.

Optionally, at 20030, the reduced 3D model is UV mapped to bring back (i.e. bake in) the texture of the asset. For example, at 20030, the metal rivets subcomponent 3006 (removed at 20026), is brought back into the reduced 3D model via normal and diffuse maps derived from UV mapping. UV mapping 20030, may add the texture of the original asset back into the reduced 3D model with minimal increases in polygon count.

At 20032, the reduced 3D model is stored in one or more databases for future use. For example, the reduced 3D model is stored on a web server. In some embodiments, the reduced 3D model is stored into specialized model libraries which are ready for in a specific application.

While the above description provides examples of one or more methods it will be appreciated that other methods may be within the scope of the claims as interpreted by one of skill in the art.

The invention claimed is:

1. A method of generating an optimized a 3D model, the method comprising:
   receiving a 3D model;
   scanning the 3D model;
   creating a provisional point cloud model from the scanned 3D model;
   recognizing one or more sharp edges in the 3D model to create edge data;
   combining the edge data with the provisional point cloud model to form a combined 3D model;
   remeshing the combined 3D model to form the optimized 3D model;
   wherein recognizing the one or more sharp edges in the 3D model to create the edge data includes:
      locating a plurality of polygons in the 3D model, each polygon defining a plane; and
      for each polygon of the plurality of polygons, determining if an adjoining polygon of the plurality of polygons is at an angle above a set threshold, the angle being measured from the plane of that polygon to the plane of the adjoining polygon.

2. The method of claim 1, wherein the 3D model is a polygon model, further comprising reducing a polygon count in the 3D model using quadratic decimation before scanning the 3D model.

3. The method of claim 1, wherein scanning the 3D model includes scanning the 3D model with a virtual camera and teleporting the virtual camera around the 3D model to find the desired direction and angle to scan the 3D model.

4. The method of claim 1, wherein recognizing the one or more sharp edges in the 3D model to create the edge data further includes setting a vertex weight of each sharp edge to a maximum vertex weight.

5. The method of claim 1, wherein recognizing the one or more sharp edges in the 3D model to create the edge data further includes setting a vertex color of each sharp edge to white.

6. The method of claim 1, wherein scanning the 3D model includes adjusting a sample density such that the provisional point cloud model contains a desired level of detail.

\* \* \* \* \*